United States Patent
Porras et al.

(10) Patent No.: US 10,205,637 B2
(45) Date of Patent: Feb. 12, 2019

(54) IMPACT ANALYZER FOR A COMPUTER NETWORK

(71) Applicant: SRI International, Menlo Park, CA (US)

(72) Inventors: Phillip A. Porras, Cupertino, CA (US); Jeffrey Klaben, San Jose, CA (US); Patrick D. Lincoln, Woodside, CA (US); Martin W. Fong, Redwood City, CA (US); Nicholas Chapin, Mountain View, CA (US)

(73) Assignee: SRI International, Menlo Park, CA (US)

( * ) Notice: Subject to any disclaimer, the term of this patent is extended or adjusted under 35 U.S.C. 154(b) by 451 days.

(21) Appl. No.: 14/824,891

(22) Filed: Aug. 12, 2015

(65) Prior Publication Data

US 2016/0218933 A1    Jul. 28, 2016

Related U.S. Application Data

(60) Provisional application No. 62/108,175, filed on Jan. 27, 2015.

(51) Int. Cl.
  *H04L 12/24*    (2006.01)
  *H04L 29/06*    (2006.01)

(52) U.S. Cl.
  CPC ............ *H04L 41/147* (2013.01); *H04L 63/20* (2013.01)

(58) Field of Classification Search
  CPC .............................. H04L 41/147; H04L 63/20
  See application file for complete search history.

(56) References Cited

U.S. PATENT DOCUMENTS

| | | | |
|---|---|---|---|
| 8,346,563 B1 | 1/2013 | Hjelm | |
| 8,650,492 B1 | 2/2014 | Mui | |
| 9,026,840 B1 | 5/2015 | Kim | |
| 9,135,914 B1 | 9/2015 | Bringert | |
| 2005/0063400 A1* | 3/2005 | Lum | H04L 63/20 370/401 |
| 2006/0010485 A1 | 1/2006 | Gorman | |
| 2007/0136788 A1* | 6/2007 | Monahan | H04L 63/20 726/3 |
| 2011/0010633 A1 | 1/2011 | Richmond | |
| 2011/0246897 A1 | 10/2011 | Lee | |
| 2013/0290520 A1* | 10/2013 | Noo | H04L 41/147 709/224 |
| 2013/0329552 A1* | 12/2013 | Carnero Ros | H04L 47/127 370/230 |

(Continued)

OTHER PUBLICATIONS

U.S. Appl. No. 14/807,782, filed Jul. 23, 2015, Office Action, dated Jul. 3, 2017.

(Continued)

*Primary Examiner* — Wing F Chan
*Assistant Examiner* — Billy H Ng
(74) *Attorney, Agent, or Firm* — Hickman Palermo Becker Bingham LLP

(57) ABSTRACT

Network management technology as disclosed herein performs an impact analysis of actual or hypothetical network commands, and presents the impact analysis results to facilitate the user's understanding of the predicted consequences of the actual or hypothetical commands on network operations, management, or security.

27 Claims, 12 Drawing Sheets

(56) References Cited

U.S. PATENT DOCUMENTS

| | | | |
|---|---|---|---|
| 2014/0059641 A1* | 2/2014 | Chapman, II | G06F 21/554 |
| | | | 726/1 |
| 2014/0123211 A1* | 5/2014 | Wanser | H04L 63/10 |
| | | | 726/1 |
| 2015/0128274 A1 | 5/2015 | Giokas | |
| 2015/0149620 A1* | 5/2015 | Banerjee | H04L 41/14 |
| | | | 709/224 |
| 2015/0279366 A1 | 10/2015 | Krestnikov | |
| 2016/0028616 A1* | 1/2016 | Vasseur | H04L 45/22 |
| | | | 370/412 |
| 2016/0080221 A1* | 3/2016 | Ramachandran | H04L 69/40 |
| | | | 709/224 |

OTHER PUBLICATIONS

Porras, U.S. Appl. No. 14/807,826, filed Jul. 23, 2015, Interview Summary, dated Jul. 28, 2017.
Porras, U.S. Appl. No. 14/807,826, filed Jul. 23, 2015, Final Office Action, dated Oct. 13, 2017.
Porras, U.S. Appl. No. 14/807,826, filed Jul. 23, 2015, Office Action, dated May 31, 2018.
Porras, U.S. Appl. No. 14/807,782, filed Jul. 23, 2015, Final Office Action, dated Jan. 12, 2018.
Porras, U.S. Appl. No. 14/807,782, filed Jul. 23, 2015, Notice of Allowance, dated Apr. 16, 2018.

* cited by examiner

IMPACT ANALYZER FOR A COMPUTER NETWORK

CROSS-REFERENCE TO RELATED APPLICATIONS

This application claims the benefit of and priority to U.S. Provisional Patent Application Ser. No. 62/108,175, filed Jan. 27, 2015, which is incorporated herein by this reference in its entirety.

Examples of technology that may be used in connection with various aspects of the present invention are described in greater detail in at least the following other patent applications of SRI International: U.S. Utility patent application Ser. No. 14/807,826 filed Jul. 23, 2015 ("Help Agent for Network Administrator"); and U.S. Utility patent application Ser. No. 14/807,782 filed Jul. 23, 2015 ("Multimodal Help Agent for Network Administrator").

BACKGROUND

This disclosure relates to the technical field of computer network operations, management, and security. Computer networks are at risk of a variety of different types of attacks. For example, a network intruder or malicious software may intercept data communications traveling through the network, or initiate commands that disrupt the networks normal operation. Some commonly known types of network attacks include wiretapping, port scanners, idle scans, denial-of-service attacks, spoofing, and cyber-attacks. Traditionally, a network is secured by implementing a well-defined security policy that is instantiated for the particular network topology. In traditional network environments, the security policy is often deployed and enforced statically and consistently across the entire network infrastructure.

Software-defined networking refers to an approach for building a computer network that allows for programmable network switch infrastructures, in which the rules that determine how the network switches are to process network flows can be dynamically specified and changed. Such programmability is useful, for instance, in the management of virtual computing resources that may be spawned or terminated on demand. The OPENFLOW network model is one example of a protocol that may be used to implement software-defined networking.

BRIEF DESCRIPTION OF THE DRAWINGS

This disclosure is illustrated by way of example and not by way of limitation in the accompanying figures. The figures may, alone or in combination, illustrate one or more embodiments of the disclosure. Elements illustrated in the figures are not necessarily drawn to scale. Reference labels may be repeated among the figures to indicate corresponding or analogous elements.

DETAILED DESCRIPTION OF THE DRAWINGS

Figure 1:
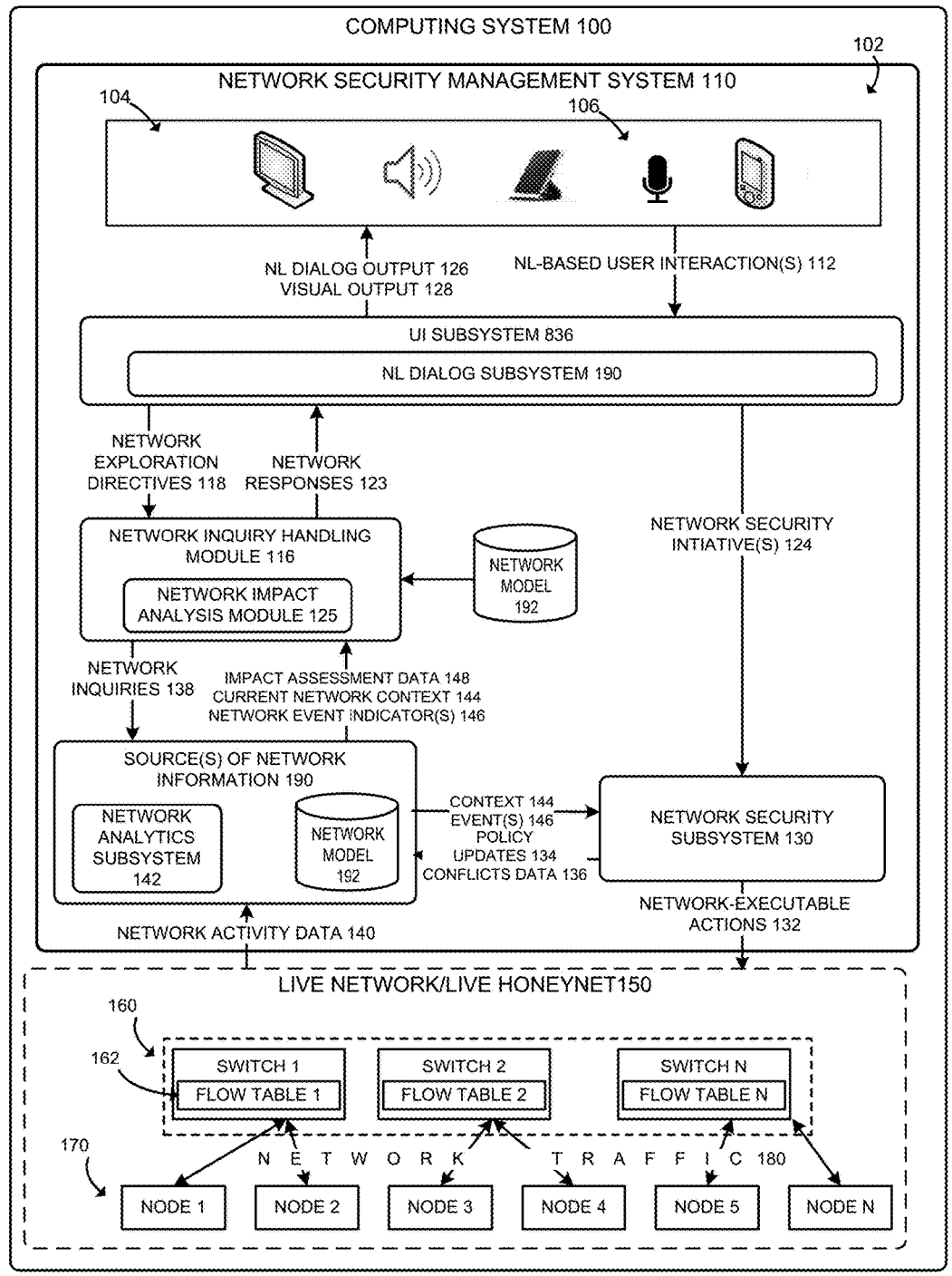
FIG. 1 is a simplified schematic diagram of at least one embodiment of an environment of a computing system, including a network security management system as disclosed herein.

While the concepts of the present disclosure are susceptible to various modifications and alternative forms, specific embodiments thereof are shown by way of example in the drawings and are described in detail below. It should be understood that there is no intent to limit the concepts of the present disclosure to the particular forms disclosed. On the contrary, the intent is to cover all modifications, equivalents, and alternatives consistent with the present disclosure and the appended claims.

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Network security management often requires administrators to review and analyze large amounts of network data to identify suspicious behavior, network threats, or disruptions. The voluminous data makes it difficult for humans or computers to quickly extract meaningful insights. To the extent that user-friendly network management tools are available, mechanisms for initiating remedial or preventative measures are not well integrated with such tools. As a result, network managers suffer from a complexity and/or coordination burden, which slows their ability to identify problems on the network and implement effective measures to resolve those problems.

Dynamically programmable networks, some embodiments of which may be referred to as software-defined networks or SDNs, can enable a flexible and adaptable network infrastructure, but also present new and unique challenges to the effective enforcement of traditional security policies. Along with its many benefits, SDN technology can create new, unintended opportunities for determined adversaries to invade and subvert network operations by dynamically reprogramming and manipulating the behavior of the network switching infrastructure.

Referring to FIG. 1, a network operations and/or security management system 110 for conducting conversational natural language dialogs with a user regarding the current status of a computer network, current, historical, or predicted cyber-threats against the network, and for interactive reconfiguration of the network responsive to threats, is disclosed herein. The system 110 includes components that receive digital alerts over time regarding current network activity and flows, as well as information regarding detected or suspected cyber-threats. Components of the system 110 conduct an interactive natural language dialog for a human user based on those alerts and information, thereby enabling a real-time natural language-based series of interactions (e.g., a "conversation") between human(s) and computer(s) regarding the network, and its current activity, flows, and cyber-threats. Components of the system 110 are designed to receive and interpret natural language specifying one or more desired courses of action to remediate cyber threats, based on a commonly recognized or defined lexicon. Such requests are expressed in a high-level manner, intuitive to the human user, and need not specify the detailed network-executable instructions that may be necessary to reconfigure the topology of the network, or to modify or disable component(s) of the network, to implement the desired courses of action (although, in some embodiments, the system 110 can reveal to the user the executable interpretation of the high-level request, e.g., for educational purposes or so that the user can verify the actions to be taken). Components of the system 110 respond to the high-level requests by dynamically generating a set of network-executable instructions, which may, for example, specify a network reconfiguration that corresponds to a higher-level desired course of action expressed by the user via natural language dialog. The network-executable instructions generated by the system 110 are based on, for example, a combination of predefined rules, network configuration data, and historical data (e.g., historical network activity data). The system 110 further includes actuation components that are designed to implement network reconfigurations that are specified by the network-executable instructions. An exemplary system is described in the context of a secure software-defined network environment; however, in other embodiments, the disclosed technology is implemented in other (e.g., non-SDN) network environments. In some embodiments, aspects of the disclosed system 110 can be used for purposes other than network security, e.g., for network operations management more generally. For example, the objective of an interaction conducted by the system 110 may be to improve the performance or reliability of the network 150 in accordance with a business objective or "mission" of the network 150, rather than to respond to or protect against network threats.

Components of the natural language (NL) processing front-end shown in FIG. 1 as an NL dialog subsystem 190 can be integrated with a touch and/or gesture-based front-end, such as described in U.S. patent application Ser. No. 14/807,782, of SRI International, thereby supporting multi-modal interaction combining verbal and nonverbal user input. The disclosed network security management architecture thereby enables a human security administrator(s) to use intuitive, natural language dialog to, for example, explore network disruptions, threats, or infections, as well as to dictate effective remedial responses that cause reconfiguring of network flows in a secure manner so as to mitigate the identified threats or infections. As used herein, "natural language" may refer to speech (including, e.g., spoken words and/or or machine-assisted speech, as may be produced by an assistive speech device), text, a combination of speech and text, etc. Further, the natural language dialogs managed and facilitated by the system 110 can be multilingual, i.e., portions of a dialog may occur in one or more different languages.

In FIG. 1, an embodiment of the network security management system 110 is embodied in one or more computing devices of a networked computing system 100. In the illustrative embodiment, the network security management system 110 establishes an environment 102 during operation (e.g., a native or virtual execution or "runtime" environment). The illustrative environment 102 includes a user interface (UI) subsystem 836 (described below, with reference to FIG. 8), the NL dialog subsystem 190, a network inquiry handling module 116, the network impact analysis module 125, a network security subsystem 130, and a number of sources of network information 190 (including a network analytics subsystem 142 and a network model 192. In some embodiments, the user interface subsystem 836 may be configured to provide an interactive graphical visualization of a computer network as described in U.S. patent application Ser. No. 14/733,899, filed Jun. 8, 2015 ("Visually Intuitive Interactive Network Defense"), of SRI International. Further, in some embodiments, the user interface subsystem 836 may be embodied as a game engine as described in U.S. patent application Ser. No. 14/733,907, filed Jun. 8, 2015 ("Visually Intuitive Interactive Network Management"), of SRI International, which may operate a two- or three-dimensional computer network visualization using a video gaming paradigm. Each of the user interface subsystem 836, the NL dialog subsystem 190, the network inquiry handling module 116, the network impact analysis module 125, the network security subsystem 130, and the network analytics subsystem 142 is embodied as computer software, firmware, hardware, or a combination thereof. For example, any of the components of the network security management system 110 may be embodied as software written in a programming language such as Java, C++, Python, etc., or a combination of hardware devices (e.g., memory, microphone, speaker, etc.) and software. As used herein, "component," "module," "instruction," "subsystem," "system," or similar terminology may refer to one or more units of computer code, for example, computer programs or instructions, embodied in one or more non-transitory machine accessible storage media.

The network operations and/or security management system 110 interfaces with a live computer network or live honeynet ("network") 150 (e.g., a physical, virtual, or software-defined network (SDN)). As used herein, "network" may refer to a computer network that is managed by one or more human network administrator(s). The illustrative network 150 is implemented as a packet-switching digital communications network. As used herein, "packet" may refer to, among other things, a data packet, a network packet, a set of data and/or control communications, or portions of such communications, which are transmitted between nodes or otherwise travel on the network 150.

The network 150 may be configured as a public, private or semi-private wired or wireless network defined by a network boundary, where the network boundary may establish a firewall between the network and one or more external networks, such as other private or semi-private networks or public networks, e.g., the Internet. As used herein, "node" may refer to any type of computing device, peripheral component, or other electronic device (e.g., a smart appliance) that is connected to the network 150, including client machines and servers (e.g., physical and/or virtual entities). An "internal node" may refer to a node that is within the boundary of the network 150, while an "external node" may refer to a node that is outside the network boundary, such as a cloud server or other computer to which one or more internal nodes can be connected via the Internet.

In some embodiments, the network 150 may be implemented as a dynamically programmable computer network, e.g., using a software-defined networking approach (such as the OPENFLOW protocol). In some embodiments, the network 150 may correspond to a physical or logical (e.g., virtualized) subset of a larger network, such as a "network slice." In some embodiments, the network 150 or portions of the network 150 may be embodied as a honeynet. As used herein, "honeynet" may refer to a network, simulated network, test network, semi-trusted network, untrusted network, network zone, software defined network, or any combination thereof that is configured for security or management purposes. For example, a honeynet may appear to be a legitimate network but intentionally set up with security vulnerabilities to invite attacks, so that attack activities and their perpetrators can be identified and analyzed to improve network security.

The network operations and/or security management system 110, e.g., the user interface subsystem 836, generates an interactive user experience including NL dialog output 126 and, in some cases, visual output 128, based on network activity data 140 and other information, as described in more detail below. The network operations and/or security management system 110 presents the interactive user experience (e.g., NL dialog output 126 and/or visual output 128) to a human user, such as a network administrator, by way of one or more user interface devices 104. As used herein, the term "network administrator" may refer to a human operator and/or a computerized agent or delegate of a human operator, such as a software application that acts under the direction of or in response to inputs from the human operator. As such, the network security management system 110 or portions thereof may be implemented as a network security software application. The user interface device(s) 104 may be embodied as, for instance, a touchscreen display device, such as may be implemented in a smart phone, desktop, laptop, or tablet computer), a wearable computing device (e.g., smart glasses, augmented reality or virtual reality goggles, or a heads-up display), a computer monitor, a television, a projection system, or another type of display device or virtual entity. In the illustrative embodiments, one or more of the user interface device(s) 104 includes audio input and output devices capable of capturing and recording human conversational spoken natural language input (or any other form of human generated language, e.g., sign language, assistive speech system, etc.), and outputting system-generated conversational spoken natural language output (such as microphones, speakers and headphones or earbuds). As described in more detail below, the system 110 can engage in a conversational natural language dialog with the user relating to current security or management issues affecting a computer network. In some embodiments, the system 110 is configured to provide a multimedia user experience (e.g. sound and/or music in combination with the NL dialog output 126 and/or visual output 128).

The network operations and/or security management system 110 interfaces with one or more user interaction detection devices 106, which are configured to detect and capture user interactions made by the user in relation to the components of the UI subsystem 836, including NL-based user interactions 112. The user interaction detection device(s) 106 may include the interactive display devices 104 and/or other human activity detection devices (e.g., various types of sensors, including motion sensors, kinetic sensors, proximity sensors, thermal sensors, pressure sensors, force sensors, inertial sensors, cameras, microphones, gaze tracking systems, and/or others). The NL-based user interactions 112 can include vocal utterances (e.g., natural language dialog speech), NL text (e.g., text or chat messages), a combination of NL speech and NL text, or a combination of NL input and non-verbal input, such as gestures or gaze. The NL-based user interactions 112 include high-level user requests relating to the computer network, such as queries and commands, expressed in an intuitive, conversational natural language form. In some embodiments, the queries and commands may include predictive text or other textual or graphical output, which is displayed visually (e.g., on a physical or virtual display device of the computing system 100).

The illustrative network security management system 110 interprets the user interactions 112 and converts the user interactions 112 to network exploration, management, or analysis directives 118 and/or network security initiatives 124. As used herein, "network security initiative" may refer to a "high level," e.g., semantic, description of a network security action that the user desires to be implemented on the network 150. As such, "high level" may refer to a higher level of abstraction than, e.g., device-readable computer code. For example, a network security initiative 124 may be embodied as a natural language instruction such as "block communications originating at this node" or "quarantine that node." As used herein, "network exploration directive" may refer to a description of an action that the user desires to be implemented by the system 110. For instance, a network exploration directive 118 may be embodied as a natural language instruction such as "show me information for that subnet" or "tell me when there is a security alert involving our homenet," or as one or more device-level instructions corresponding to a higher-level directive. Other examples of network exploration directives 118 involve querying the system 110 for specific data, for example, to request that the visual output 128 display additional details about the current behavior of a network flow or node. In some embodiments, network exploration directives 118 and/or network security initiatives 124 may be implemented directly as device-executable instructions. For example, in some embodiments, portions of the network security subsystem 130 that convert "higher-level" network security initiatives 124 to "lower-level" network security directives (as described below) may be omitted, as the network security initiatives 124 may themselves constitute lower-level network security directives or device-executable instructions. Table 1 below lists illustrative examples of NL-based interactions 112 uttered by a user, by interaction type, which the system 110 can interpret and implement as disclosed herein.

TABLE 1

Exemplary NL dialog-based interactions.

| Interaction Type | Exemplary NL-based interactions |
|---|---|
| Network flow monitor | notify me if any new web, DNS, or mail servers that appear in my network<br>tell me if my SSH Server accepts a connection from an ITAR host that lasts greater than 120 seconds<br>notify me if my Web Server fails to connect to our software update server more than 5 times in one minute |
| Network security directive (initiates a network reconfiguration) | quarantine any host in my network that initiates a connection to Evil IP and redirect all connections from Evil IP to my honeynet<br>activate course of action DELTA! (interpreted based on a predefined library or dynamically defined and stored lexicon)<br>disconnect all BitTorrent Servers from my network when the network bandwidth exceed 100 megabits per second<br>capture all the data packets involving my web servers and ITAR Restricted sites<br>quarantine any of my hosts that attempts to connect to more than 3 different blacklisted IP address in 1 minute |
| Query | what would happen if we block the SSH port to my wireless network?<br>which of my network users have visited dropbox.com more than 3 times this month?<br>last night, did any host from my network send more than 1 MB of data to any non-US locations? |

The NL-based interactions listed in Table 1 are exemplary and non-limiting. For instance, some embodiments of the system 110 are configured to handle all or a subset of the following types of network management activities through the use of NL dialog-based interactions: initiate (and customize) a pre-planned network lock-down (e.g., defcon DELTA!); redirect a source or traffic flow matching a specified criteria into a proxy or honeynet; quarantine an internal asset matching a specified criteria; deny or log any flow that matches a specific criteria; instantiate a watchdog to report on a flow or entity matching a specified criteria; express a recovery strategy in response to an asset failure, flood, or network fault; specify alarms for network-wide pattern or phenomena; express a constraint to be enforced on all traffic meeting a specific criteria based on time-of-day, geography, flow type or content, or the roles of the internal assets involved; explore what-if scenarios as to what would happen if a network configuration change were applied given recent network traffic history.

When the network security management system 110 interprets a user interaction 112 as a network exploration directive 118, the system 110 may utilize a network inquiry handling module 116 to generate a network inquiry 138 and/or proceed to manipulate at least a portion of the view of the visual output 128 in accordance with the particulars (e.g., arguments or parameters) of the network exploration directive 118. When the network security management system 110 interprets a user interaction 112 as a network security initiative 124, the illustrative system 110 translates the network security initiative 124 to one or more network security directives. As used herein, a "network security directive" or "network directive" may refer to an action to be taken in furtherance of the operation, management, or security of the network 150, and may include one or more network-executable actions 132 and/or security policy updates 134. As used herein, "network-executable actions" may refer to, e.g., device-executable instructions, such as computer code or executable scripts, which can be implemented by one or more devices on the network 150 to perform, for example, a diagnostic or remedial action in response to a detected infection or other type of network threat. For example, a network-executable action 132 may be embodied as a set of network flow rules that can be instantiated at one or more network switches 160. As used herein, "security policy update" may refer to an automated or manually-effectuated mechanism by which a security policy for the network 150 can be dynamically updated (by, e.g., reconfiguring a rule, instantiating a new rule, populating a data structure, changing a data value in a database or table, executing computer code, etc.).

By presenting the voluminous and complex network data as requested, according to an intuitive natural language dialog between system 110 and the user, the network security management system 110 can greatly simplify the network management tasks of the human administrator. The system 110's ability to system-generate context-relevant natural language output (and thereby converse with the user by conversational spoken natural language dialog) allows the system 110 to present complicated network data in an easy to understand conversational form that can greatly enhance the user experience, reduce network administrator fatigue. The underlying dialog translation architecture translates the conversational natural language dialog to device-executable instructions in an automated fashion, thereby having the potential to increase the network administrator's responsiveness to network events and reduce the risk of human error in the implementation of network security initiatives.

Some embodiments of the network security management system 110 specifically leverage the dynamic nature of the SDN architecture by, for example, converting the user interactions 112 to sets of instructions that can be implemented directly by switching devices on the network 150 (e.g., to dynamically reconfigure the data plane or the behavior of the switches).

Referring now in more detail to the components of the embodiment of the network security management system 110 shown in FIG. 1, the illustrative network 150 includes a plurality of network switching devices 160 (e.g., switch 1, switch 2, switch "N," where "N" is a positive integer) and a plurality of nodes 170. The network switching devices 160 each may be embodied as, for example, a switch, a router, a load balancer, a learning switch, or another type of physical or virtual network device. For instance, in dynamically-programmable networks, the devices 160 may each have a local flow table 162 that can by updated dynamically by flow rules (e.g., by network applications or administrators during operation of the network). In other embodiments, the devices 160 may be configured without a local flow table 162, or the local flow table 162 may be pre-programmed (i.e., not reprogrammable during network operation). Each of the nodes 170 may be embodied as any suitable type of computing resource, e.g., client device, a server computer, group of server computers, or one or more other devices that are configured to communicate with the switches 160 to send and receive data packets over the network 100. For simplicity, the illustrative network 150 is shown with a fixed number of nodes 170 per switch 160; however, the network 150 may include any number of nodes 170 in communication with any number of switches 160.

Figure 2:
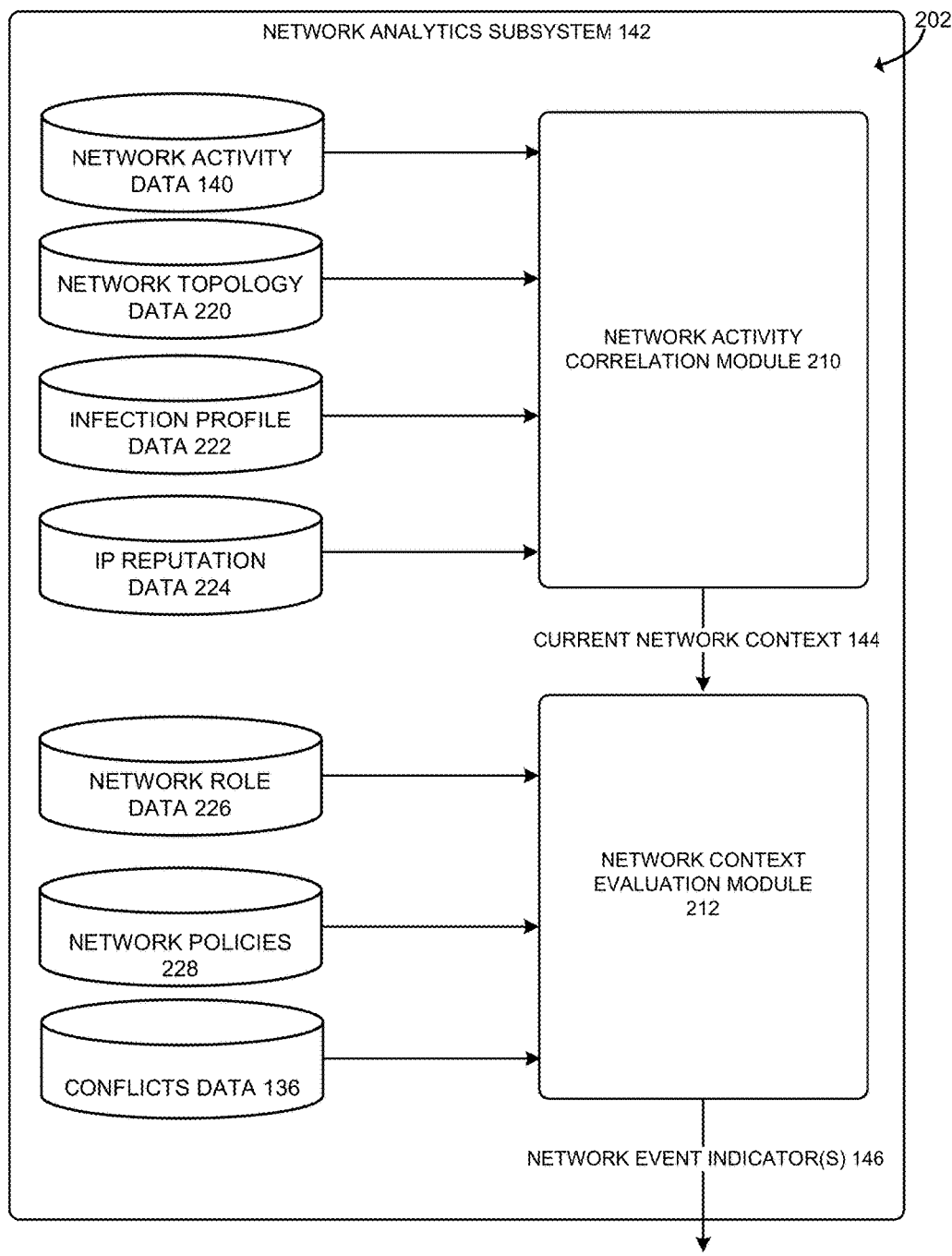
FIG. 2 is a simplified schematic diagram of at least one embodiment of an environment that may be established by a network analytics subsystem of the network security management system of FIG. 1.

The switches 160 each communicate with one or more of the nodes 170 to effectuate the flow of network traffic 180 across the network 150 in accordance with a network security management policy or policies 228 (FIG. 2). As used herein, terms such as "network traffic" and "network flow" may refer to, in the context of the network 150, groups or sequences of data packets from a source computer to a destination, where the destination may be, for example, another host, a multicast group, or a broadcast domain. In some cases, network flow may refer to a logical equivalent of a call or a connection. A network flow may include all of the data packets in a specific transport connection or media stream. However, a network flow need not be directly mapped to a transport connection. A network flow can also be thought of as a set of data packets that pass an observation point in the network 150 during a certain time interval.

Portions of the network 150 may be configured as a dynamically-programmable network (such as a software-defined network) or as more traditional computer network. In embodiments of the network 150 that are configured as a dynamically-programmable network, a security policy 228 (FIG. 2) may be implemented at the switches 160 as a number of network flow rules, which are maintained at the switches 160 in local flow tables 162 (e.g., flow table 1, flow table 2, flow table "N," where "N" is a positive integer). The local flow tables 162 are used by their respective switches 160 to instantiate flow rules at the switch 160 and direct the network traffic 180 between the nodes 170. As described in more detail below, the network-executable actions 132 produced by the network security management system 110 can, for example, add, modify, or delete flow rules stored in the local flow tables 162, e.g., to improve the security of the network 150.

During live operation of the network 150, the network components (e.g., switches 160 and nodes 170) generate network activity data 140. The network activity data 140 may be embodied as, for example, security system or network logs, access control logs, etc. For example, the network activity data 140 may be indicative of one or more network flows identified within the network traffic 180. The network activity data 140 may include data describing attributes, statistics, counters, or other data relating to network flows, individually or collectively, within the network traffic 180. The network activity data 140 may include computed data, such as aggregate statistics describing network activity for all or a portion of the network 150 during one or more discrete time intervals. The network activity data 140 may be generated by, e.g., one or more network sensors or passive network monitoring programs.

Illustrative, non-limiting examples of network activity data 140 relating to network flows include the source and destination Internet address (e.g., the IP addresses associated with the TCP session initiator and TCP server, respectively) of the flows, the source and destination port, protocol (e.g., TCP or UDP (User Datagram Protocol), start time, end time, or duration. The network activity data 140 may include statistical information on data transferred, including the number of zero-length packets sent by the client or the server, the number of nonzero-length packets (i.e., data packets) sent by the client or the server, the total number of bytes produced by the client or the server, the total number of packets produced by the client or the server, or the average size of data packets produced by the client or the server. The network activity data 140 may include geographical data associated with the endpoints (i.e., the client and server) of the network flows. The geographical data may include any data describing the physical location of an endpoint, such as the country name, country code, city, or geographical coordinates at a given time. The geographical data may be described using, for example, an IP geolocation database such as MaxMind® GeoIP®. The network activity data 140 may include domain names associated with the endpoints of the identified network flows. In some embodiments, the network flows may be associated with domain names observed in a DNS (Domain Name System) query.

The illustrative network inquiry handling module 118 issues network inquiries 138 (e.g., processor-executable queries) to obtain information about the network 150 from one or sources of network information 190. Illustratively, the sources of network information 190 include the network analytics subsystem 142 and a network model 192. The illustrative network analytics subsystem 142 is embodied as one or more components or modules that analyze the network activity data 140 over time to determine network flow characteristics and node behaviors that may indicate the existence of a network disruption, infection, or some other type of network threat or incident. The network analytics subsystem 142 generates data indicative of a current network context 144 and, particularly when an infection or threat is detected, one or more network event indicators 146. As used herein, "current network context" may refer to data indicative of a current state of the network 150 in which data communications are taking place. The network activity data 140 may include historical records of network activity.

The data generated by the network analytics subsystem 142 may be diagnostic or predictive. For example, the current network context 144 may include data indicative of the number of local nodes 170, the hardware or software configuration of the nodes 170, the endpoints and directions of network flows (where an "endpoint" may be, for example, an internal node or an external node), duration of connections between two endpoints, flow volume, patterns of network flows, patterns of node behavior, security threats detected, infections detected, nodes currently involved in or likely to be affected by security threats or infections, and/or other network activity. Some illustrative, non-limiting examples of technology available from SRI International that may be utilized by the network analytics subsystem 142 to analyze current network conditions, diagnose infections, identify network threats, or predict network events, are described in U.S. Pat. No. 8,955,122 ("Method and Apparatus for Detecting Malware Infection"); U.S. Patent Application Publication No. 2009/00064332 ("Method and Apparatus for Generating Highly Predictive Blacklists"); and U.S. Patent Application Publication No. 2014/0331280 ("Network Privilege Manager for a Dynamically Programmable Computer Network"), all of SRI International. An embodiment of the network analytics subsystem 142 is described in more detail below, with reference to FIG. 2.

The illustrative network model 192 is embodied as, for example, computer code, a computer data structure or searchable knowledge base, or a combination of computer code and data structures, which is stored in memory of the computing system 100. The network model 192 may store information about the network architecture, the mission or business objective(s) of the network 150, entities connected to the network (e.g., high level information about nodes and links, such as user names, roles, geographic locations, business purposes or "missions" for the network and/or subnets, and applications running on different devices). Portions of the network model 192 may provide an abstracted view of the network 150 that is independent of implementation details. For instance, portions of the network model 192 may specify conceptual layers of the network protocol stack according to a reference model, such as the Department of Defense (DoD) or Open Systems Interconnection (OSI) model for the Internet protocol stack. Examples of such protocol layers include (from top to bottom of the stack): application layer, transport layer, network layer, data link layer, and physical layer. Each protocol layer is implemented as software, hardware, or a combination of software and hardware, and each layer may itself utilize a number of different protocols to implement the functionality of that layer, depending on the particular implementation of the network 150.

In general, the network protocol stack defines the functionality of the network; i.e., the technology that enables a wide variety of different types of computing devices to communicate with one another over the network 150. The protocol stack can be conceptualized as beginning at a low level of abstraction (i.e., closer to the hardware) and progressing through successively higher levels of abstraction up the stack (i.e., closer to the user interface). Network communications are handled by functionality at each layer and then "exported" to the next layer in the stack. For example, the physical layer may handle the transmission of data bits that are propagated over a communication medium, such as copper wire, optical fiber, radio waves, etc. The data link layer may aggregate the bits into a data packet and perform data transfer between connected network elements (e.g., Ethernet to WIFI or vice versa). The network layer may handle the routing of data packets from source to destination using routing protocols. The transport layer may perform the process-to-process communication of the data packets or messages using a transmission protocol such as Transmission Control Protocol (TCP). The application layer handles the final message and supports various network applications, such as data transfer applications (e.g., file transfer protocol or FTP, hypertext transfer protocol or HTTP, simple mail transfer protocol or SMTP, etc.). The services of the protocol stack can be invoked by computer applications through, e.g., scripting languages such as JavaScript or application programming interfaces (APIs) (e.g., sockets programmed using Java or C++).

Portions of the network model 192 may contain a graphical, numerical, textual, algorithmic, programmatic, or mathematical representation of the manner in which communications across the network 150 are handled in accordance with a business objective or mission of the network. For instance, portions of the network model 192 may include arguments, parameters, or logic that define the behavior of the network 150 under certain usage conditions or based on various business objectives. As an example, suppose that portions of the network 150 support the internal operations of an e-commerce business such as EBAY or AMAZON. In this case, the business objective or mission of the network 150 may be to provide reliable customer service or support database operations. The ability of the network 150 to provide low-latency communications between users may be less important for the e-commerce vendor than for a messaging or communications vendor such as SKYPE. Thus, the system 110 can configure network initiatives, actions, impact analyses, suggestions, and alternatives according to the mission or business objectives of the network 150, which may be reflected in the network model 192 and/or other information 190 that is available to the system 110.

The illustrative user interface subsystem 836 is embodied as one or more components or modules that may convert the data retrieved from or supplied by the source(s) of network information 190 (e.g., data indicative of the current network context 144, the network event indicators 146, and/or the impact assessment data 148), which may be output by the network analytics subsystem 142 or supplied by the network model 192, for use by the NL dialog output 126 and/or visual output 128. For example, components of the user interface subsystem 836 may be embodied in software using commercially available natural language dialog software, including speech and/or text-based online chat or SMS (Short Message Service)-style messaging front end software (e.g., software written using a computer programming language such as Python or Java). In some embodiments, the user interface subsystem 836 (e.g., the NL dialog subsystem 190) may perform authentication processes to verify a user's identity. For example, the user's identity may be verified using voice biometrics as disclosed in, for example, Scheffer et al., U.S. patent application Ser. No. 13/358,900, filed Jul. 27, 2012 and entitled "Multi-Sample Conversational Voice Verification;" and Scheffer, U.S. patent application Ser. No. 13/333,020, filed Dec. 21, 2011 and entitled "Method and Apparatus for Generating Speaker-Specific Spoken Passwords," both of which are incorporate herein by this reference in their entirety.

In some embodiments, the user interface subsystem 836 captures the user's spoken natural language dialog input with a microphone or other audio input device of the computing system 100. Alternatively or in addition, the user interface subsystem 836 captures text-based natural language dialog input by, for example, a touch pad, key pad, or touch screen of the computing system 100 (e.g., via a text messaging application or real-time "chat" application). Other (e.g., non-NL dialog) user inputs also may be captured by, e.g., a touch pad, keypad, touch screen, assistive speech system, or other input device, through the user interface subsystem 836. Such non-NL dialog inputs may include, for example, mouse clicks, taps, swipes, pinches, and/or others. In some cases, the user interface subsystem 836 may capture "off-device" body movements or other gesture-type inputs (such as hand waves, head nods, eye movements, etc.) by, e.g., a camera, motion sensor and/or kinetic sensor, which may be integrated with or otherwise in communication with the computing system 100 as discussed above. In any event, the captured user inputs are at least temporarily stored in memory of the computing system 100.

The NL dialog subsystem 190 is embodied as one or more hardware and/or software components or modules that detect, capture, and interpret user interactions 112 (including gesture-based interactions, natural language dialog-based user interactions, and combinations of different types of interactions), and convert the user interactions 112 to network exploration directives 118 or network security initiatives 124, as the case may be. For instance, portions of the NL dialog subsystem 190 may written in a computer programming language such as Java and/or utilize Extensible Markup Language (XML) data structures. Some illustrative, non-limiting examples of technology available from SRI International that may be utilized by the NL dialog subsystem 190 to capture and interpret user interactions are described in the following patent applications of SRI International: U.S. Patent Application Publication No. 2012/0313854 ("Adaptable Input/Output Device") and U.S. Patent Application Publication No. 2013/0311508 ("Method, Apparatus, and System for Facilitating Cross-Application Searching and Retrieval of Content Using a Contextual User Model"). The NL dialog subsystem 190 and illustrative example translations of NL-based interactions 112 to network directives are shown in FIGS. 3, 5A, 5B, and 5C, described below.

The illustrative network inquiry handling module 116 is configured to generate network inquiries 138 as needed to obtain data such as the current network context 144, network event indicators 146, and impact assessment data 148 from the source(s) of network information 190 (e.g., the network analytics subsystem 142 and/or the network model 192). The network inquiries 138 are embodied as executable queries that are formatted according to the requirements of the respective component of the source(s) of network information 190 (e.g., the network analytics subsystem 142 and/or the network model 192) (e.g., structured query language (SQL) queries or other types of commands). For example, in some embodiments, the source(s) of network information 190 (e.g., the network analytics subsystem 142 and/or the network model 192) may include a suite of different software components that each perform different data collection, network diagnostic or analytics functions (e.g., one or more software products such as Arcsight, SourceFire, BotHunter, Qualys, firewalls, routers, intrusion detection systems, etc.), and the network inquiry handling module 116 may translate a network exploration directive 118 created by the NL dialog subsystem 190 into a query format that is usable by one or more of these software components (e.g., CISCO restAPIs, nmap arguments, qualys scanner arguments, SDN infrastructure arguments, OpenFlow applets, third party alert database query formats and/or network flow analytics query formats).

The illustrative network inquiry handling module 116 includes a network impact analysis module 125. The network impact analysis module 125 handles network exploration directives 118 that include a request for information about the potential impact of a network security initiative 124, should it be implemented by the network 150. An example of an "impact analysis" request is a "what if" scenario" posed by the user to explore potentially indirect or unintentional impact or consequences of a proposed security remediation action (such as blocking network connections, quarantining nodes, or redirecting network flows). In some embodiments, the system 110 may be configured to automatically intercept certain network security initiatives 124 and perform a network impact analysis on each intercepted network security initiative 124 before the initiative 124 is implemented by the network 150. To do this, the user interface subsystem 836 may formulate a network exploration directive 118 that includes the important details of the intercepted network security initiative 124 (e.g., arguments such as node identifier and command type), and the network inquiry handling module 116 may incorporate those portions of the intercepted network security initiative 124 into one or more network inquiries 138, which are sent to one or more components of the network analytics subsystem 142.

To perform the network impact analysis, the network impact analysis module 125 interfaces with one or more components of the network analytics subsystem 142 to obtain impact assessment data 148 produced in response to the network inquiries 138. For instance, the network impact analysis module 125 may provide network topology data, network role data, historical network management data (e.g., number of data flows and/or connections to a node over the previous N minutes, hours, days, weeks, months, etc. (where N is a positive integer), and/or live network traffic data, which the network analytics subsystem 142 may use to analyze the proposed network security initiative 124. As a result of its analysis of the impact assessment data 148 (which may include portions of the current network context 144 and/or network event indicators 146), the network impact analysis module 125 may assign a risk level to the network security initiative 124. For example, the risk level of a network security initiative 124 may be "high" if implementation of the network security initiative 124 by the network 150 would disconnect a server from the network 150 that hosts important data or an important enterprise-wide service like email or document management. On the other hand, the risk level of the network security initiative 124 may be "low" if the node to be disconnected is a single individual's personal machine or mobile device. The network inquiry handling module 116, may output or otherwise make available to the user interface subsystem 836 one or more network responses 123. The network responses 123 may include data retrieved as a result of one or more network inquiries 138 submitted by the network inquiry handling module 116 to one or more components of the source(s) of network information 190 (e.g., the network analytics subsystem 142 and/or the network model 192). The user interface subsystem 836 may incorporate the network responses 123, or portions thereof, into NL dialog output 448 as described in more detail below, or the user interface subsystem 836 may incorporate the network responses 123, or portions thereof, into the visual output 128. As additional examples, the network impact analysis module 125 may compute a risk assessment for a particular actual or proposed/hypothetical security remediation action, give the current network context 144 to help the network administrator determine the likely consequences of different security remediation options, e.g., if node X is quarantined, or if node Y is blocked, or data flow Z is redirected, will this be a problem? The risk assessment computed by the network impact analysis module 125 can not only indicate whether a problem is likely, but also estimate the severity level, e.g., low, medium, or high risk, as described above. In some cases, the network impact analysis module 125 may perform a risk analysis in response to the user asking the system 110 for a recommended course of action (as opposed to the user deciding on a course of action and then asking the system 110 for an impact analysis). In this case, the system 110 may generate a set of possible (or "candidate") courses of action, perform an impact analysis on each of the candidate courses of action, and then generate a recommendation by, e.g., selecting the candidate course of action that has the lowest risk according to the impact analysis. Additionally, as part of the impact analysis, the network impact analysis module 125 may present (e.g., via NL dialog output 126) an explanation of the reasoning supporting the computed impact analysis. Such information may include, for instance, the number of data flows that would have been denied over a certain time period, had the requested course of action been implemented, or the number of network nodes that would have been impacted by the requested course of action if implemented, or information about the criticality of a node that would have been impacted (e.g., whether the node is running a critical software application or is connected to a critical asset). Of course, the criteria for measuring "criticality" may be defined differently depending on the business objective or mission of the entity operating the network. The predictions generated by the impact analysis module 125 are based on, for example, historical network activity data 140, which may be obtained from one or more components of the source(s) of network information 190 (e.g., the network analytics subsystem 142 and/or the network model 192).

The illustrative network security subsystem 130 is embodied as one or more components or modules that translate the network security initiatives 124 to network-executable actions 132 or security policy updates 134, as the case may be. Some illustrative, non-limiting examples of technology available from SRI International that may be utilized by the network security subsystem 130 to convert higher-level directives (e.g., natural language descriptions of network actions) to network-executable instructions are described in U.S. Patent Application Publication No. 2014/0075519 ("Security Mediation for Dynamically Programmable Network"); U.S. Patent Application Publication No. 2014/0317684 ("Security Actuator for a Dynamically Programmable Network"); and U.S. Patent Application Publication No. 2014/0331280 ("Network Privilege Manager for a Dynamically Programmable Computer Network"), all of SRI International. An embodiment of the network security subsystem 130 is described in more detail below, with reference to FIG. 5.

Referring now to FIG. 2, an embodiment of the network analytics subsystem 142 is shown in more detail. The illustrative network analytics subsystem 142 establishes an environment 202 during operation (e.g., a native or virtual execution or "runtime" environment). The environment 202 includes a network activity correlation module 210 and a network context evaluation module 212, which interface with data stores containing the network activity data 140, network topology data 220, infection profile data 222, IP reputation data 224, network role data 226, network policies 228, and conflicts data 136. Portions of the network activity data 140, network topology data 220, infection profile data 222, IP reputation data 224, network role data 226, network policies 228, and conflicts data 136 may be received, accessed or obtained from other systems and stored in computer memory, e.g., in a searchable data structure such as a database, table, data file, or XML (eXtensible Markup Language) data structures. The components and modules shown in FIG. 2 may each be embodied as hardware, firmware, software, or a combination thereof (e.g., software written using a programming language such as Java or Python).

The illustrative network activity correlation module 210 is configured to determine the current network context 144, continuously or periodically at discrete time intervals. Particularly in embodiments in which the network 150 is implemented as a dynamically programmable network, the current network context 144 may be indicative of the dynamic properties of the network traffic 180; that is, the current network context 144 reflects, e.g., the current behavior of nodes 170 on the network 150 at a discrete time instance. The current network context 144 may include any data or relationship associated with the current dynamic state of the network flows within the network traffic 180. The network activity correlation module 210 may determine the current network context 144 based on any combination of network activity data 140, network topology data 220, infection profile data 222, IP reputation data 224, and/or other data.

The network activity correlation module 210 may periodically determine the current version of network activity data 140, network topology data 220, infection profile data 222, IP reputation data 224, network role data 216, and/or network policies 228, at a given time instance, and algorithmically correlate portions of such data to identify and/or network threats and infections. Such correlating may involve, for example, querying one or more of the data 140, 220, 222, 224 to determine matching attributes, executing pattern matching algorithms, etc. For example, the network activity correlation module 210 may correlate IP reputation data 224 indicating that a particular external node is on a blacklist with current network activity data 140 indicating that an internal node is currently connected to the blacklisted node. As another example, the network activity correlation module 210 may predict that an internal node may be at risk of a security attack based on its proximity in the network topology to another node that has already experienced the security attack. Illustrative, non-limiting examples of technology that can be used to correlate network threat and/or infection data with current network activity data are described in the aforementioned U.S. Pat. No. 8,955,122 ("Method and Apparatus for Detecting Malware Infection"); at www.bothunter.net; in U.S. Patent Application Publication No. 2009/00064332 ("Method and Apparatus for Generating Highly Predictive Blacklists"); and U.S. Patent Application Publication No. 2014/0331280 ("Network Privilege Manager for a Dynamically Programmable Computer Network").

The network activity data 140 may indicate, in addition to node behavior and flow information, specific details about the nodes' current activity. For instance, the network activity data 140 may identify software applications currently running on a particular node and/or connections made by those software applications. The illustrative network topology data 220 may be obtained from, e.g., a network management software system used to configure and manage the network 150, and may include data indicative of the number, type, and arrangement of nodes 170 and switching devices 160 on the network 150. For instance, the network topology data 220 may identify nodes by Internet protocol (IP) address, and also indicate the device type (e.g., server, desktop, mobile device, etc.), connection type (e.g., wired, Wi-Fi, or cellular), operating system platform (e.g., Android, Windows, iOS), neighboring nodes, etc. The infection profile data 222 includes, for example, statistical information based on historical infection data, or other information, which indicates typical patterns or behaviors of known infections.

The IP reputation data 224 includes a list of known malicious Internet addresses and associated data describing the malicious addresses, the type of threat, and other information relating to the trustworthiness of the malicious Internet address. For example, the IP reputation data 224 may be embodied as a large-scale network address blacklist. Alternatively or in addition, the IP reputation data 224 includes a list of Internet addresses and associated data describing addresses that are known to be acceptable or permitted in accordance with a security policy 228 (e.g., a whitelist). Collectively or individually, the various types of IP reputation data 224 may be referred to as access control data. Along with the malicious or acceptable IP address, as the case may be, the IP reputation data 224 may also identify other data associated with the IP address, such as one or more threat types associated with a malicious address. The threat types may identify the malicious address as associated with, for example, a malware drive-by exploit site, an Internet site associated with malware, a malware command and control site, an aggressive Internet scanner, a site associated with email abuse or spam, a malicious advertisement site, or any other threat type. Also, the IP reputation data 224 may include other data associated with the malicious IP address, such as the associated Internet service provider, domain name, ASN (Autonomous System Number) numeric code, AS (Autonomous System) identity, estimated network speed, geographical data, or business sector. In some embodiments, the IP reputation data 224 may include corroboration data indicating whether other worldwide data sources have also identified the malicious IP address as associated with malware, ASN threat percentile data indicating the relative percentile of malicious IP addresses concentrated within the ASN, or an indication of whether the domain associated with the malicious IP has been created within the last thirty days. The IP reputation data 224 may be updated regularly (e.g., daily) or as new threats are identified.

The network activity correlation module 210 outputs the current network context 144 for evaluation by the network context evaluation module 212. The network context evaluation module 212 applies network role data 226 and/or network policies 228 to the current network context 144 to evaluate the current network context 144 based on the role data 226 and/or policies 228. To do this, the network context evaluation module 212 may determine the network policies 228 and/or role data 226 that match the current network context 144 (e.g., by running queries or similarity algorithms). The network context evaluation module 212 may select applicable network policies 228 based on criteria that match, e.g., the current network activity data 140, the IP reputation data 224, and/or the network role data 226. For instance, the network context evaluation module 212 may apply a matching threshold and/or duration to the applicable security policies 228. The matching threshold and duration may require that at least a certain number of network flows be matched within a given duration prior to triggering identification of a network event. As another example, the network context evaluation module 212 may require a threshold number of matching network flows originating from the same source address to trigger the identification of a network event. The network context evaluation module 212 may generate one or more network event indicators 146 based on its evaluation of the current network context 144.

The illustrative network role data 226 may define abstract network roles and associate the network roles with particular network addresses, subnets, or other address specifiers. The network role data 226 may be prepared by a network administrator to correspond to the topology or other design of the network 150. For example, the network role data 226 may group addresses into types of machines (e.g., workstation, server, peripheral device, etc.). As another example, the network role data 226 may segment the network 150 into functional tiers or zones (e.g., web tier, database tier, application tier, etc.). Example roles may include workstation, peripheral, application server, network device, ignored device, infrastructure asset, or any other network role that may be defined by a network administrator. Network roles may be defined hierarchically or otherwise tailored to particular network topologies. For example, network roles may be grouped into one or more super-roles or tiers (e.g., a web tier, application tier, and database tier). The network role data 216 may be configured by a network administrator, for example using one or more configuration files.

In some embodiments, the network role data 226 and/or another data store accessible by the system 110 may include data that may be used to indicate the criticality of one or more of the devices on the network 150, e.g., software applications hosted by the device, etc., as discussed elsewhere in this document. In some embodiments, information about network users and/or administrators (such as contact information, roles, privileges, etc.) may also be included in the network role data 226 and/or other data stores accessible by the system 110.

The network policies 228 may be defined by a network administrator and may specify the rules for handling various different types of network conditions and events. As noted above, in dynamically programmable networks, the policies 228 can be flexible to adapt to changing network conditions or even to conditions at a particular node 170 or switching device 160. The network policies 228 may be embodied as any appropriate data format, including, for example, as one or more extensible markup language (XML) files. In some embodiments, each policy 228 may specify a set of criteria to be matched against the current network context 144. A policy 228 may specify a response to be generated when matching traffic is encountered. The response may include any directive, command, handling decision, or other action to enforce the network security policy. For example, the response may be embodied as a directive to drop all flows matching the criteria, block a particular address, quarantine a particular address, redirect flows from a particular address, ignore all records matching the criteria, produce a warning for each record matching the criteria, log each record matching the criteria, execute an arbitrary shell command, or any other action.

The conflicts data 136 may be embodied as, for example, a log file generated by the conflict analyzer module 426 of FIG. 5, discussed below. The conflicts data 136 may include historical data relating to conflicts between candidate network executable actions 132 generated by the security initiative translator module 410 and existing network policies 228, as detected by the conflict analyzer module 426, as well as data indicating how those conflicts were resolved by the conflict analyzer module 426.

As a result of its evaluation of the current network context 144, the network context evaluation module 212 may identify one or more network events in accordance with the role data 226, conflicts data 136, and/or policies 228. For example, the current network context 144 may include data indicative of a network threat, but the network policies 228 or role data 226 may be defined for the network 150 such that the network context evaluation module 212 concludes that the threat does not currently require any action to be taken to respond to the threat. In this case, the network context evaluation module 212 may not output a network event indicator 146 corresponding to the identified network event, or may output a graphical element indicative of the network event but which indicates that the event is currently of lower priority. As the current network context 144 evolves over time, the network context evaluation module 212 may reassess the identified network event according to the new context 144 and may increase the priority of the network event and then output a corresponding network event indicator 146 at that time.

The network context evaluation module 212 outputs network event indicators 146 for presentation by the user interface subsystem 836 (e.g., as NL dialog output 126 and/or visual output 128). As used herein, a "network event indicator" may refer to data indicative of a network event that is to be included in the system output 126, 128. Such data may include, for example, node and/or flow identifying information (e.g., IP addresses, MAC addresses) identifying nodes and/or flows affected or predicted to be affected by a threat or infection, threat or infection indicators (e.g., the type of threat or infection), threat or infection severity or priority indicators, and/or other data.

Figure 3:
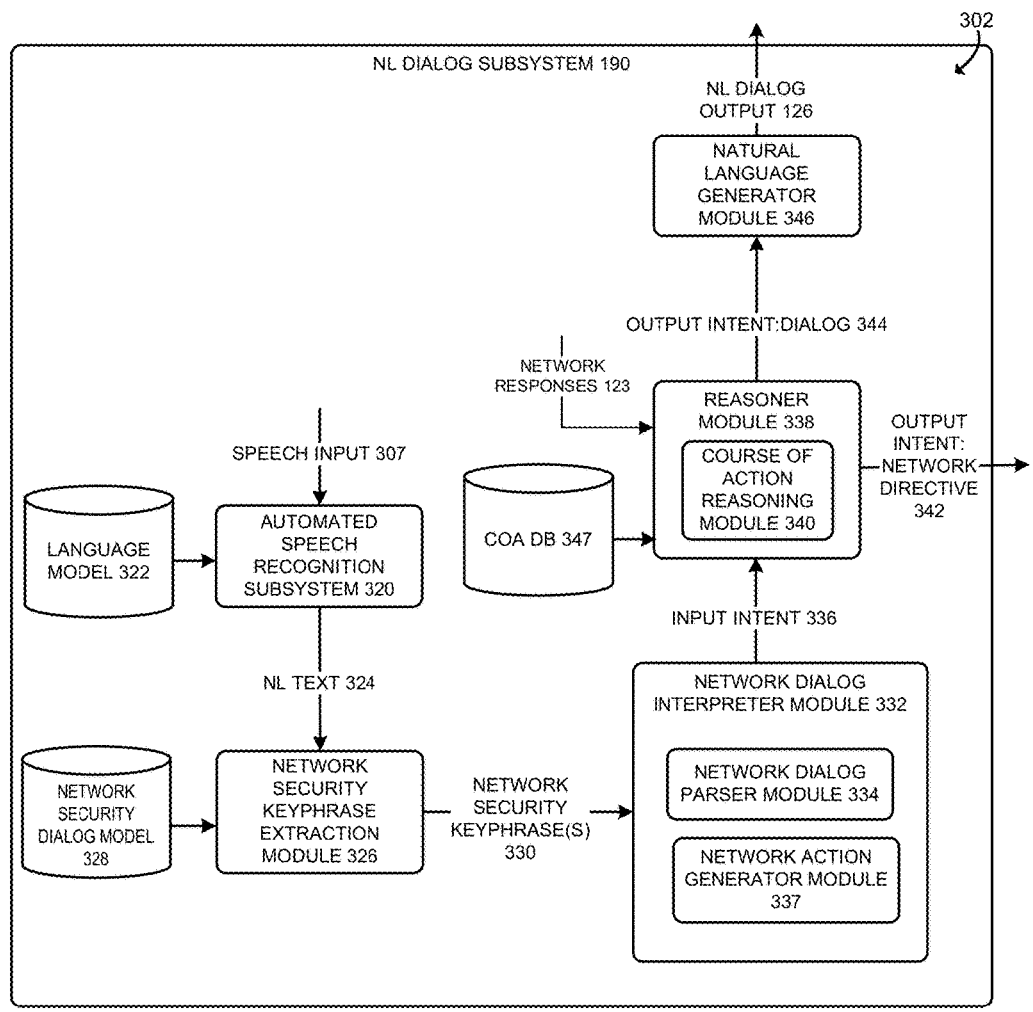
FIG. 3 is a simplified schematic diagram of at least one embodiment of an environment that may be established by a natural language dialog subsystem of the network security management system of FIG. 1.

Referring now to FIG. 3, an embodiment of the NL dialog subsystem 190 is shown in more detail. The illustrative NL dialog subsystem 190 utilizes an NL dialog processing platform, such as a generic virtual assistant platform as described in, e.g. U.S. Patent Application Publication No. 2013/0152092. The NL dialog subsystem 190 is augmented with or interfaces with network security domain-specialized modules that allow the network security management system 110 to conduct a conversational natural language dialog with a user (e.g., a network administrator) regarding computer network security, and for translating high-level "course of action" user requests into network directive output intents 342 (e.g., network policy specifications, commands, visualization requests, queries, monitoring requests, and/or other appropriate directives. Using technologies disclosed herein and/or other commercially available natural language processing technology, the NL dialog subsystem 190 enables the user to carry on a natural language conversation with the computer network security system to gather relevant information (e.g., current network context 144), explore network visualization and/or remediation options, and request remedial action. Remedial network security actions may include, for instance, diversion of a particular network flow, or quarantine of a node.

The NL dialog subsystem 190 and/or components of the network security subsystem 130, described below, translates these high-level user requests into digital directives that specify the user-requested network reconfigurations in a form that is actionable by one or more components of the network 150. In some embodiments, the NL dialog subsystem 190 translates these user requests (e.g., network security initiatives 124) into an intermediate, relatively platform independent format using, for example, technology described in U.S. Patent Application Publication 2014/0331280. In some embodiments, the network security initiatives or intermediate-level directives are converted to actionable, network-executable instructions (e.g., packet disposition directives) executable by a network infrastructure, such as the SDN switching infrastructure. In some embodiments, SDN security mediation technology is also employed to provide a highly secure SDN mechanism for dynamically reconfiguring the data plane and the behavior of network switching devices. Examples of these and other security directive translation and security mediation technologies are described in U.S. Patent Application Publication 2014/0331280 and U.S. Patent Application Publication No. 2014/0075519.

The NL dialog subsystem 190 establishes an environment 302 during operation (e.g., a native or virtual execution or "runtime" environment). The environment 302 includes an automated speech recognition subsystem 320, a language model 322, a network security keyphrase extraction module 326, a network security dialog model 328, a network dialog interpreter module 332, a network dialog parser module 334, a network action generator module 337, a reasoner module 338 (including a course of action reasoning module 340), and a natural language generator module 346. The components and modules shown in FIG. 3 may each be embodied as hardware, firmware, software, or a combination thereof (e.g., software written using a programming language such as Java or Python, and/or XML data structures).

The NL dialog subsystem 190 processes the NL dialog inputs 112, but other forms of user interactions may be analyzed by the NL dialog subsystem 190 to aid in its understanding of the NL dialog inputs 112, and determines the intent of the NL dialog inputs 112 given the current context of the network 150 as evidenced by the network responses 123. The NL dialog subsystem 190 determines a suitable response to the NL dialog inputs 112, which may include presentation of NL dialog output 126 (alone or in combination with visual output 128) and/or implementation of a network directive 342. As used herein, "natural language" may refer to words, phrases, verbal expressions, and/or combinations thereof, which are formulated by a human, device, or system in a fashion that is or is intended to approximate or simulate speech that normally arises in an unpremeditated fashion as the result of the innate facility for language possessed by the human intellect (as distinguished from, for example, structured computer programming languages or code). As used herein, terms such as "dialog" and "conversational" may refer to the use of natural language (e.g., spoken or written) in the context of a communicative exchange of information, ideas, opinions, sentiments, observations, questions and answers, statements and responses, or the like, involving a user and a computing device, in a manner that is more typical of natural human-to-human conversation. As used herein, an "intent" may refer to a structured representation of a system-generated interpretation of the speech input 307. For example, an intent may include semantic information indicative of the user-intended meaning of the speech input 307. Stated another way, an intent may represent a likely intended goal or objective of the user that is deduced by the NL dialog subsystem 190 from the NL dialog input 112.

Terms such as "goal" and "objective" are used herein may convey that in some embodiments, the NL dialog subsystem 190 attempts to determine not only the words of the speech input 307, but the semantic meaning, e.g., user's actual intended goal or objective, which he or she used those words to express. To do this, the NL dialog subsystem 190 may consider non-verbal interaction data and/or information pertaining to the network (which may include aspects of the current network context 144, the network event indicators 146, and/or the impact assessment data 148). As an example, the user might say something like "kill that node"—which in this context means that the user's goal is disconnect a particular external node from the network 150, where the identifying information for "that node" may be derived from the dialog history or non-verbal interaction data (e.g., as a result of the user pointing at a graphical depiction of "that node" on the display). Determining the intended goal or objective of a user's natural language dialog can involve the application of artificial-intelligence based automated reasoning methods and systems. In some embodiments, intents may be predefined as, e.g., XML data structures, which are then instantiated in response to the receipt of NL speech 307. That is, the NL dialog subsystem 190 may ascribe values to one or more arguments of a predefined intent based on a particular instance of the NL speech 307.

In the case of spoken natural language inputs, the automated speech recognition (ASR) subsystem 320 processes the natural language speech input 307 using a language model 322, and generates a machine-readable version of the user's speech (and/or speech patterns) that can be further analyzed and processed by the network security keyphrase extraction module 326 and other modules of the NL dialog subsystem 190. Typically, an ASR system identifies spoken words and/or phrases in the spoken natural language dialog inputs and recognizes and converts them into text form (e.g., words, word strings, phrases, "segments," "sentences," or other forms of verbal expression). To do this, the ASR subsystem 320 accesses and utilizes the language model 322 to map various acoustic features of the speech signal (i.e., the NL speech input 307) with the corresponding words most likely matching the acoustic features. There are many ASR systems commercially available; one example is the DYNASPEAK system, available from SRI International. While the ASR subsystem 320 is shown in FIG. 3 as a component of the NL dialog subsystem 190, in other embodiments, the ASR subsystem 320 may be an external (e.g. third party) component with which the network security management system 110 communicates. The ASR subsystem 320 outputs or otherwise makes available to the network security keyphrase extraction module 326, NL text 324, which has been determined by the ASR subsystem 320 to correspond to the speech input 307.

The illustrative network security keyphrase extraction module 326 accesses and utilizes a network security dialog model 328 to identify and extract words or phrases from the NL text 324 that are indicative of, e.g., a network exploration directive 118 or network security initiative 124 (e.g., a query, command, or monitoring request). The illustrative network security dialog model 328 may be embodied as, for example, an ontology that defines relationships or associations between words or phrases and their meaning in the context of network security, or as a set of rules, templates, or grammars, etc. For example, the network security dialog model 328 may be used by the network security keyphrase extraction module 326 to determine that natural language phrases found in the NL text 324 such as "tell me," "my printers or copies," "connects to," "IP addresses outside the U.S.," or "stop the connection" likely correspond to, e.g., commands, actions, arguments, or parameters of a network exploration directive 118 or network security initiative 124 and thus should be extracted from the NL text 324 for further analysis. The network security keyphrase extraction module 326 outputs or otherwise makes available to the network dialog interpreter module 332, the network security keyphrases 330, which the network security keyphrase extraction module 326 has extracted from the NL text 324. Some illustrative examples of translations of NL speech input 307 are provided in Table 2 below, and in FIGS. 5A-5C, described below. As can be seen by the examples in Table 2 and FIGS. 5A-5C, the system 100 can process many different types of NL-based interactions, including complex interactions such as conditional actions, multi-level commands, recommendation requests, and "what-if" impact analysis inquiries. Additional dialog examples are provided in U.S. Provisional Patent Application Ser. No. 62/108,175.

The network dialog interpreter module 332 performs one or more automated natural language interpretation techniques on the network security keyphrases 330. If network responses 132 are available, the network dialog interpreter module 332 may utilize the network responses 123 to interpret the network security keyphrases 330. For example, the network dialog interpreter module 332 may identify the network data flow corresponding to "the connection" in the speech input 307 as involving certain IP (Internet Protocol) addresses, based on the network responses 132. The illustrative network dialog interpreter module 332 converts the relatively unstructured network security keyphrases to structured data, e.g., input intents 336. To do this, a network dialog parser module 334 of the illustrative network dialog interpreter module 332 develops a network dialog parse tree based on the extracted keyphrases 330, and a network action generator module 337 translates the parse tree to a network security directive, such as a flow policy directive or packet disposition directive, using, e.g., technology disclosed in U.S. Patent Application Publication 2014/0331280 and U.S. Patent Application Publication No. 2014/0075519. Examples of parse trees produced by the network dialog parser module 334 and network directives produced by the network action generator module 337 are provided in FIGS. 5A-5C, described below. The parse trees may be implemented as, e.g., XML data structures.

In some embodiments, the network dialog interpreter module 332 interprets the key words and/or phrases 430

TABLE 2

Exemplary system translations of NL dialog-based interactions.

| NL speech | Interaction Type | NL text (with keyphrases in brackets) | Network Directive |
|---|---|---|---|
| "Which of my computers has connected to an address listed in the ShadowServer blacklist?" | Network Query | Which of [my computers] has [connected to] an [address listed in the ShadowServer Blacklist] [?] | Criteria<br>  Event type: Outbound Flow<br>  Subject 1: my computers<br>  Subject 2: Shadow Server Blacklist<br>Actions<br>  Action 1: Query history |
| "quarantine any host in my network that initiates a connection to a discovered malicious IP address and redirect all connections from discovered malicious IP to my honeynet" | Multi-action command | [quarantine] any [host in my network] that initiates a [connection to][a discovered malicious IP] address and [redirect] all [connections from] [a discovered malicious IP] [to] my [honeynet]" | <FBPolicy><br><ACTION<br>NetCat= "QUARANTINE -quarantineIP %SrcIP -dnsIP 10.10.10.10 -notifierIP 10.10.10.10"<br>NetCat= "REDIRECT -dstIP %addr – remapIP %My_Honeynet"<br>    Markflow="ALICE1,srcIP,dstIP"<br>><br><CRITERIA<br>cid="ALICE-Mon-3:30pm"<br>Description="Quarantine of local host who connects to evil IP"<br>Marked="!~ALICE1" DstIP = "EvilIP"<br>SrcRole="%Homenet"<br>SrcByteCnt="gt1"<br>/><br></ACTION><br></FBPolicy> |
| "disconnect my local BitTorrent Servers from the network when the network bandwidth exceeds 100 megabits per second." | Conditional action | [disconnect] my local [BitTorrent Servers] from the network when the [network bandwidth exceed 100 megabits per second] | <ACTION<br>    Netcat="Disconnect -srcIP %SrcIP – timeout 15mins"<br>/><br><CRITERIA cid="Alice-Monday-9am"<br>    Description="No Bittorrent when network load exceeds 100Mbs"<br>    TotalByteCnt="gt100,000,000"<br>    SrcRole="%BitTorrentServer"<br>    SrcPort="%BitTorrentPortRange"<br>    DstPort="%BitTorrentPortRange"<br>/><br></ACTION> | produced by the ASR subsystem 320 and extracted by the keyphrase extraction module 326 based on other words or phrases extracted from the speech input 307 during the user's current and/or previous dialog sessions with the system 110. For instance, network dialog interpreter module 332 may apply a rule-based parser and/or a statistical parser to provide a semantic interpretation of the keyphrases 330. An illustrative example of a natural language understanding component that may be used in connection with network dialog interpreter module 332 is the SRI Language Modeling Toolkit, available from SRI International. The network dialog interpreter module 332 converts the keyphrases 330 to one or more input intents 336. The network dialog interpreter module 332 passes or otherwise makes the input intents 336 available to the reasoner module 338.

The illustrative reasoner module 338 analyzes the input intent 336 and, in some cases, portions of the current visual output 128, and determines what the system 110 should do in response to the input intent 336. For instance, the reasoner module 338 may execute computer logic such as task flows, as described in, for example, U.S. Patent Application Publication No. 2013/0152092. Task flows and/or other course of action logic may be stored in, e.g., a course of action database (COA DB) 346. The reasoner module 338 generates one or more output intents, e.g., a dialog output intent 344 and/or a network directive output intent 342, which represents the system 110's response to the input intent 336 (e.g., a fulfillment of the user's likely intended goal or objective as expressed in the speech input 307, as interpreted by the NL dialog subsystem 190). If the output intent is a dialog output intent 344, the reasoner module 338 passes or otherwise makes available the output intent 344 to the system natural language generator module 346. Some illustrative examples of dialog output intents 444 include system-generated requests for further clarification of the speech input 307 (e.g., in cases in which the interpreter module 332 has a relatively low confidence level in the accuracy of its interpretation of the speech input, e.g., confidence level is less than a predefined threshold). Other examples of dialog output intents 444 include responses to user queries and other requests (including recommended courses of action, current network context information, network event information, and impact assessment information), and confirmations that the system 110 is going to execute a user-requested command (e.g., "are you sure you want me to disconnect that node from the network? OK, disconnecting the node from the network"). If the output intent is a network directive output intent 342, the reasoner module 338 passes or otherwise makes available the output intent 342 to the network security subsystem 130 (e.g., as a network security initiative 124) or to the interactive network visualization subsystem 112 (e.g., as a network exploration directive 118).

The illustrative reasoner module 338 includes a course of action (COA) reasoning module 340. The illustrative COA reasoning module 340 is configured to synthesize the input intent(s) 336 using the COA DB 347, the network responses 123, and/or any of the other available inputs (e.g., visual output 128, impact assessment data 148, current network context 144, and/or network event indicators 146) determine, using automated reasoning (e.g., rule-based reasoning or classifiers) a likely appropriate task flow, "work flow" or other steps or processes to execute on the user's behalf, and/or a likely appropriate system response to the user's intended goal or objective as derived from the meaning of the speech input 307 and reflected in the input intent 336 (where "likely appropriate" may refer to a computed statistical measure of confidence determined and/or evaluated by the COA reasoning module 340). In some cases, the likely appropriate system task may be to perform a requested action on the computing system 100 (such as initiate a network-executable action 132 or execute a network inquiry 138), whereas in other cases, an appropriate system task or response may be to present information to the user to elicit from the user additional inputs that may help the NL dialog subsystem 190 more accurately develop the input intent 336. The COA reasoner module 340 may initiate or execute one or more such task flows, "work flows," etc., to create the output intents 342, 344, and to determine the data values (if any) to pass to one or more other modules of the NL dialog subsystem 190 (e.g., the natural language generator module 346, the network security subsystem 130, or the interactive network visualization subsystem 112), along with the output intent(s) 342, 344. In some cases, the COA reasoning module 340 may pass the output intents 342, 344 back to interpreter module 332 for use in interpreting future instances of speech input 307.

In some embodiments, the COA reasoning module 340 may perform the functions of a dialog manager, which keeps track of the current state and flow of each conversation or dialog that occurs between the user and the system 110. In such an embodiment, the COA reasoning module 340 may apply dialog-managing rules, templates, or task flows, for example, to the user's NL dialog input 307, which are appropriate in view of the current context. For example, the COA reasoning module 340 may apply rules for determining when a conversation with the user has started or ended, or for determining whether a current non-verbal input is related to a speech input.

In some embodiments, the COA reasoning module 340 may determine that more than a single action should be performed in response to the input intent 336. For example, an input intent 336, "block my printer from connecting to an IP address outside the United States" may correspond to multiple network directive output intents 342: "monitor for connections from my printer to IP addresses outside the U.S." and "block my printer."

If the COA reasoning module 340 has determined an appropriate course of action by which to respond to the NL speech input 307 that includes a dialog output intent 344, the COA reasoning module 340 communicates the dialog output intent 344 to the natural language generator module 346. The dialog output intent 344 may specify the content of system output that the reasoner module 338 believes (e.g., has a high degree of statistical confidence) is likely appropriate in response to the input intent 336. For example, if the input intent 336 is "notify me when a new web server appears on the network," the COA reasoning module 340 may determine by executing various task flows, analyzing the intent history, and/or conducting other automated (e.g., artificial intelligence-based) reasoning activities, that an appropriate dialog output intent 344 is system-generated NL dialog output in the form of a notification that "a new web server has connected to the network." In some embodiments, the input intents 336 and the output intents 342, 344 may be embodied as parameter list structures, with each parameter having predefined attributes. As used herein, "pass" or "make available" or similar terminology may be used to refer to, for example, computer programming techniques in which one or more data values are included as arguments to called functions or procedures. Any suitable method of data communication may be used, including inter-process communications and/or others.

The natural language generator (NLG) module 346 generates a natural language version of the dialog output intent 344, the NL dialog output 126, which is output via e.g., one or more speakers, displays, or other user interface and/or user interaction detection devices 104, 106. To do this, the NLG module 346 may map the output intent 344 to one or more predefined NL response rules or templates. In some embodiments, the NL responses may be embodied as templates for system-generated natural language output, including parameters representing fields in which specific data values may be inserted. For example, an NL response may include the phrase "Which <node> do you want to disconnect"), where <node> indicates a parameter that may be replaced with a data value obtained or derived from the speech input 307 or a subsequent round of NL dialog with the user. A speech synthesizer or text-to-speech (TTS) module may be used to convert natural-language text generated by the natural-language generator module 346 to speech (e.g., machine-produced speech using a human or humanlike voice), and played through a speaker of the computing system 100. Alternatively or additionally to the NL dialog output 126, a network directive output intent 342 may be formulated as a network exploration directive 118, which may be processed by the user interface subsystem 836 to update or change the view or contents of the visual output 128.

Figure 4:
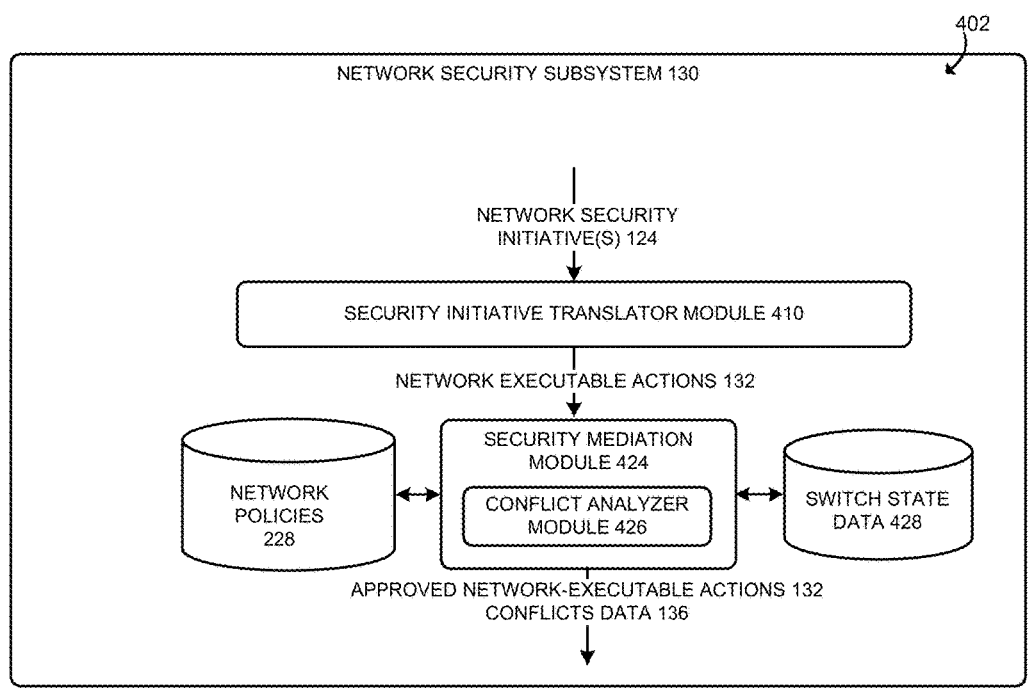
FIG. 4 is a simplified schematic diagram of at least one embodiment of an environment that may be established by a network security subsystem of the network security management system of FIG. 1.

Referring now to FIG. 4, an embodiment of the network security subsystem 130 is shown in more detail. The illustrative network security subsystem 130 establishes an environment 402 during operation (e.g., a native or virtual execution or "runtime" environment). The environment 402 includes a security initiative translator module 410, a security mediation service 424, a conflict analyzer module 426, network policies 228, and network switch data 428. The components and modules shown in FIG. 4 may each be embodied as hardware, firmware, software, or a combination thereof (e.g., software written using a programming language such as Java or Python).

Portions of the network security subsystem 130 may embodied in or as a network flow controller of the network 150. In other embodiments, portions of the network security subsystem 130 may be considered part of a "control plane" of the network 150 but not necessarily part of a network controller. For instance, the security initiative translator module 410 may be embodied as a network application that communicates with a network controller via, e.g., an application programming interface (API). As an example, using the OPENFLOW framework, the security initiative translator module 410 may communicate with a network controller via a northbound API, where, for example, the security initiative translator module 410 contains a client-side northbound API and the network controller contains a server-side northbound API.

The security initiative translator module 410 or the security mediation module 424 may communicate directly with one or more of the network switches 160 via, e.g., a southbound API of an OPENFLOW network. Alternatively, the security initiative translator module 410 or the security mediation module 424 may communicate with the network switches 160 indirectly via a network controller, or the security initiative translator module 410 may communicate with the network switches 160 indirectly via the security mediation module 424. In some embodiments, the security initiative translator module 410 may be included as a component of the security mediation module 424 (e.g., operate in the same process space as other components of the network security subsystem 130).

The execution of the network security subsystem 130 is also usually separated from any processes that may be running at the switches 160 (e.g., the "data plane"). For example, in some embodiments, at least some components of the network security subsystem 130 are not implemented as part of a firewall. The network security subsystem 130 may be embodied as a software abstraction of the network control layer (e.g., "control plane") of the network switches 160. For instance, portions of the network security subsystem 130 may be implemented as part of or as an extension to an SDN controller, such as an OpenFlow controller. In other embodiments, portions of the network security subsystem 130 may be embodied in a shim layer between a network controller and network applications, or as part of another type of network virtualization layer. In any case, the network security subsystem 130 may execute on one or more computing devices (e.g., servers), separately from the network switches 160 and/or separately from other computing devices on which any network applications may be running. The network security subsystem 130 may be connected to each of the switches 160 using, e.g., a dedicated control connection.

The illustrative security initiative translator module 410 analyzes the network security initiatives 124 produced by the user interface subsystem 836 and generates one or more network-executable actions 132 configured to implement the network security initiatives 124 on the network 150 and/or security policy updates 134. For example, whereas a network security initiative 124 may comprise a high level directive corresponding to a gesture to "quarantine that node," the network-executable actions 132 produced by the security initiative translator module 410 can include device-executable instructions that can be implemented by, e.g., one or more switching devices 160, to implement the network security initiative 124. For instance, quarantining a node may translate to a set of switch instructions to drop all communications from the quarantined node or redirect communications from the quarantined node to a honeynet. Some examples of technology that may be used to implement the security initiative translation module 410 are described in the aforementioned U.S. Patent Application Publication No. 2014/0317684 ("Security Actuator for a Dynamically Programmable Network"); and U.S. Patent Application Publication No. 2014/0331280 ("Network Privilege Manager for a Dynamically Programmable Computer Network").

The network security initiatives 124 may be transported to the network security subsystem 130 using any suitable format, transport, or protocol usable by the network security subsystem 130. In some embodiments, the security initiative translator module 410 converts the network security initiatives 124 directly into a number of network-executable actions 132 (e.g., packet disposition directives) that control the flow of traffic over the network 150. As discussed above, the network security initiatives 124 may include high-level threat-mitigation or security remediation directives that are then translated into lower-level network-executable instructions 132 (which may be referred to as "packet disposition directives" or "flow rules" in some embodiments). As used herein, "higher-level" and "lower-level" may refer to, among other things, relative degrees of abstraction, where higher-level may refer to network security directives that are more like human-intelligible text (and may not be directly executable by network switches or other network devices) and lower-level may refer to network security directives that are more like machine-intelligible codes and less like human-intelligible text (and may be directly executable by network switches or other network devices).

Some embodiments of the security initiative translator module 410 may resolve the higher-level network security directives using a pre-defined set of templates, rules, or policies, which may include, for example, "block," "deny," "allow," "redirect," "quarantine," "undo," "constrain," and/or "info" directives. A "block" directive may, for example, cause the system 110 to implement a full duplex filter between a Classless Inter-Domain Routing (CIDR) block and the internal network, where the primary use for this command is in blacklist enforcement. The deny, allow, undo, and info directives may be similar to their firewall counterparts and can be capable of being refined down to an individual flow rule. A "redirect" directive may, for example, enable a network application to tunnel all flows between a source and given target to a new target.

In response to a network-executable action 132, a switch 160 may, for example, proceed to rewrite the packet headers of all applicable network flows such that a source cannot tell that its flows have been redirected to the new target. One application of the "redirect" directive includes the redirection of a malicious scanner into a honeynet. A "quarantine" directive may enable a network application to essentially isolate an internal host from the network. A "constrain" directive may enable a network application to deactivate all current flow rules in the switches 160 that are not set to a specified priority (e.g., flow rules that are non-privileged).

The illustrative security mediation module 424 receives network-executable actions 132 (e.g., packet disposition directives) from the security initiative translator module 410. In some embodiments, the security mediation module 424 is non-bypassable, while in other embodiments, portions of the security mediation module 424 may be bypassable. In non-bypassable implementations of the security mediation module 424, the security mediation module 424 is implemented between the security initiative translator module 410 and the network switches 160, so that all network-executable actions pass through or are intercepted by the security mediation module 424 before being implemented by the switches 160. The security mediation module 424 evaluates the network-executable actions 132 based on the then-current network policies 228. After a network-executable action 132 has been evaluated by the security mediation module 424, the security mediation module 424 may communicate a corresponding security policy update 134 to the network policies 228 and/or may communicate the network-executable action 132 to one or more of the network switches 160.

As used herein, a "packet disposition directive" may refer to flow rules or any computer logic or instruction that determines or results in the disposition of one or more data packets by the switches 160 on the network 150, or which changes the switches' behavior or configuration in any way. Some examples of potential packet dispositions include "forward" (in which a data packet is sent on to its next, intermediate or final, destination), "drop" (in which a switch deliberately does not send a data packet on to its next destination, because, for example, the switch's capacity is overloaded or the switch believes that the packet is part of a denial-of-service attack), and "modify" (in which information in the packet header is modified by the directive). The packet disposition directives may conform to or extend a software-defined network protocol implemented by a network flow controller. For example, in some embodiments, the packet disposition directives may be OpenFlow messages. In some embodiments, the packet disposition directives may directly correspond to flow rules that can be directly instantiated at the network switches 160.

As used herein, a "flow rule" may refer to packet disposition directives that contain logic or instructions that, if executed at the network switches 160, do control the flow of data packets across the network 150. Thus, the set of all flow rules instantiated on the network 150 can embody a current implementation of the network security policy. However, in dynamically programmable implementations of the network 100, 150 rules, and thus, the network security policy, can be modified "on the fly" by the packet disposition directives. Thus, as used herein, "dynamically" connotes a network in which the flow rules, and thus the security policy, may be constantly varying or changing in response to, for example, the then-current network conditions. As used herein, terms such as "currently active flow rules" or "currently active directives" refer generally to the set of network-executable actions 132 (e.g., flow rules and/or other packet disposition directives) that, at a particular moment in time during the operation of the network 150, represents the then-current network security policies 228. As used herein, terms such as "candidate flow rule" or "candidate directive" may refer to, among other things, any flow rule or other packet disposition directive that is not currently part of the set of currently active directives. In other words, "candidate flow rules" may refer to flow rules that have not yet been evaluated by the security mediation module 424, are currently being evaluated by the security module 424, or that have been evaluated but rejected by the security mediation module 424.

To simplify the discussion, flow rules are referred to herein as having two main parts: match criteria and actions. The match criteria determine whether a flow rule applies to a particular data packet. The match criteria include a number of match fields, including those that specify source and destination criteria for matching data packets to the flow rule. The source and destination match fields each identify particular computing resources by any suitable references or identifiers, such as IP addresses, network masks, ports, and the like. In some embodiments, match fields other than source and destination may be used to evaluate the applicability of a flow rule to a data packet, and in some embodiments, one match criterion or multiple match criteria may be used.

A flow rule may contain one or more actions. The action(s) contained in the flow rule specify what action(s) are to be taken by a network switch if the flow rule applies to a particular data packet; that is, if the values of the match fields of the flow rule match the values of the corresponding match fields in the header of the data packet. An action may specify a disposition for the data packet, for example, to drop, forward, or modify the data packet. Some flow rules may specify that the data packet's header information is to be modified or rewritten, e.g., using a "set" action (in OpenFlow terminology), if the flow rule applies to the packet. Some flow rules may specify that the data packet is to be forwarded to the network controller for further analysis.

The illustrative security mediation module 424 validates the sources of the network-executable actions 132 (e.g., packet disposition directives or flow rules), analyzes the network-executable actions 132 for conflicts with existing network policies 228 and/or already-instantiated network-executable actions 132, and performs conflict resolution. The security mediation module 424 detects and resolves conflicts quickly, allowing for real-time or near-real time control of the network-executable actions 132. The illustrative security mediation module 424 is embodied as a number of computerized modules and data structures (e.g., software, firmware, hardware, or a combination thereof), which may execute or be resident on the same computing device or group of computing devices as a network flow controller, and/or on one or more other computing devices that are connected to the network 150.

To receive network-executable actions 132 from the security initiative translator module 410, the security mediation module 424 may include one or more network communication interfaces. For example, network-executable actions 132 may be received from the security initiative translator module 410 using an application programming interface (API), such as a northbound API of a network flow controller and/or the security mediation module 424. Network-executable actions 132 may be received from the security initiative translator module 410 using an inter-process communication mechanism such as pipes, sockets, or the like. For example, network-executable actions 132 may be received through a secure sockets layer (SSL) communication from the security initiative translator module 410.

The illustrative security mediation module 424 maintains the current status of the network security policies 228, as well as switch state data 428. The switch state data 428 tracks the current state of the network policies 228 on the network 150, as it changes over time during the operation of the network 150. The switch state data 428 thus stores data relating to the currently active network-executable actions 132. The switch state data 428 also stores data relating to security roles and data relating to the current state of each of the local flow tables 162 of the switches 160 as it changes over time during the operation of the network 150.

The illustrative conflict analyzer module 426 is configured to detect and resolve conflicts between network-executable actions 132 generated as a result of user interactions 112 and the then-current security policies 228 and/or switch state data 428. Acceptable network-executable actions 132 are implemented on the switches 160. Additional examples of technology that may be used to implement the components of the security mediation module 424 are described in the aforementioned U.S. Patent Application Publication No. 2014/0075519 ("Security Mediation for Dynamically Programmable Network").

Figure 5A:
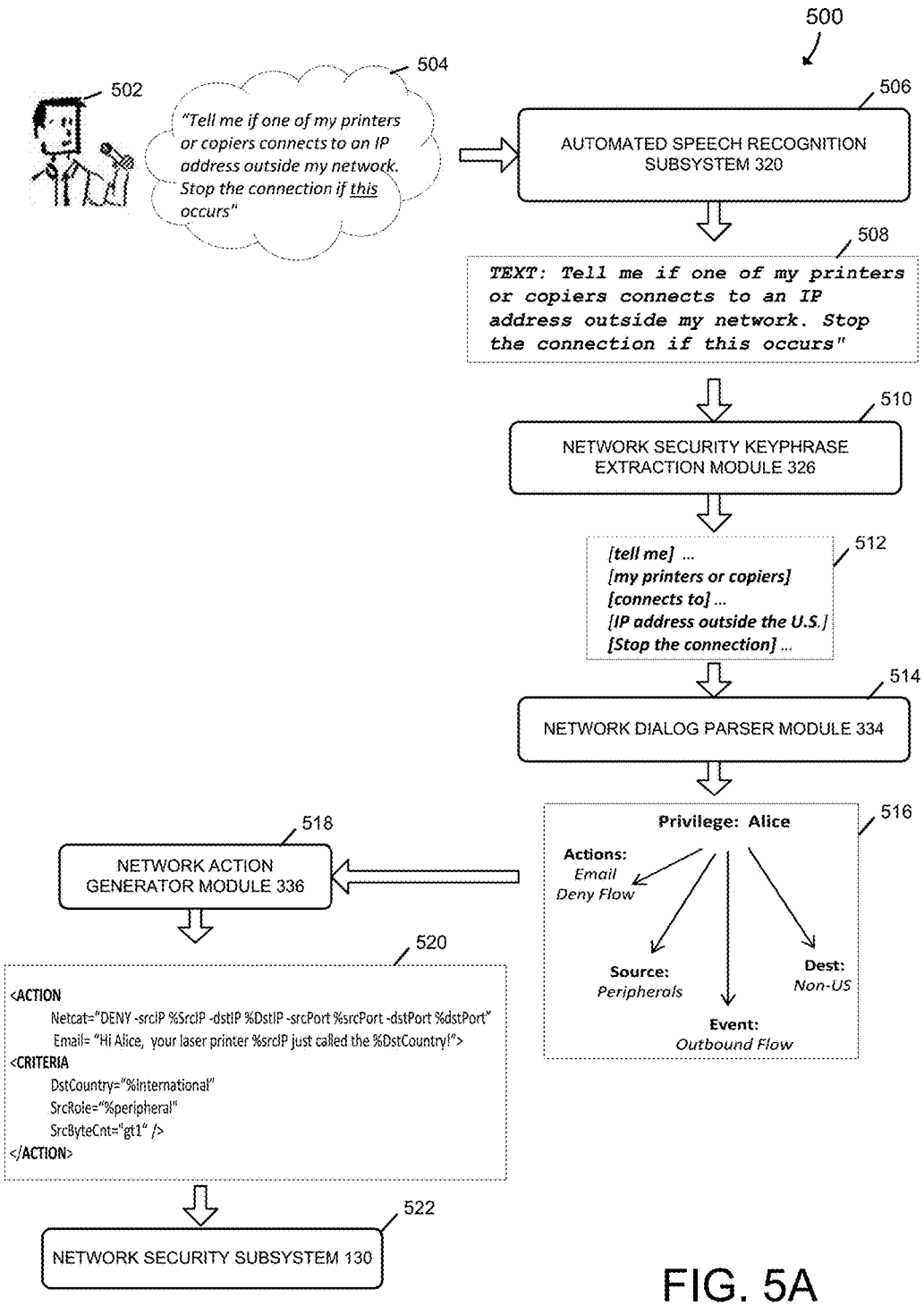
FIG. 5A is a simplified flow diagram of at least one embodiment of an operational process by which the computing system of FIG. 1 may translate natural language dialog input to a network directive actionable by the network security subsystem of FIG. 1.
Figure 5B:
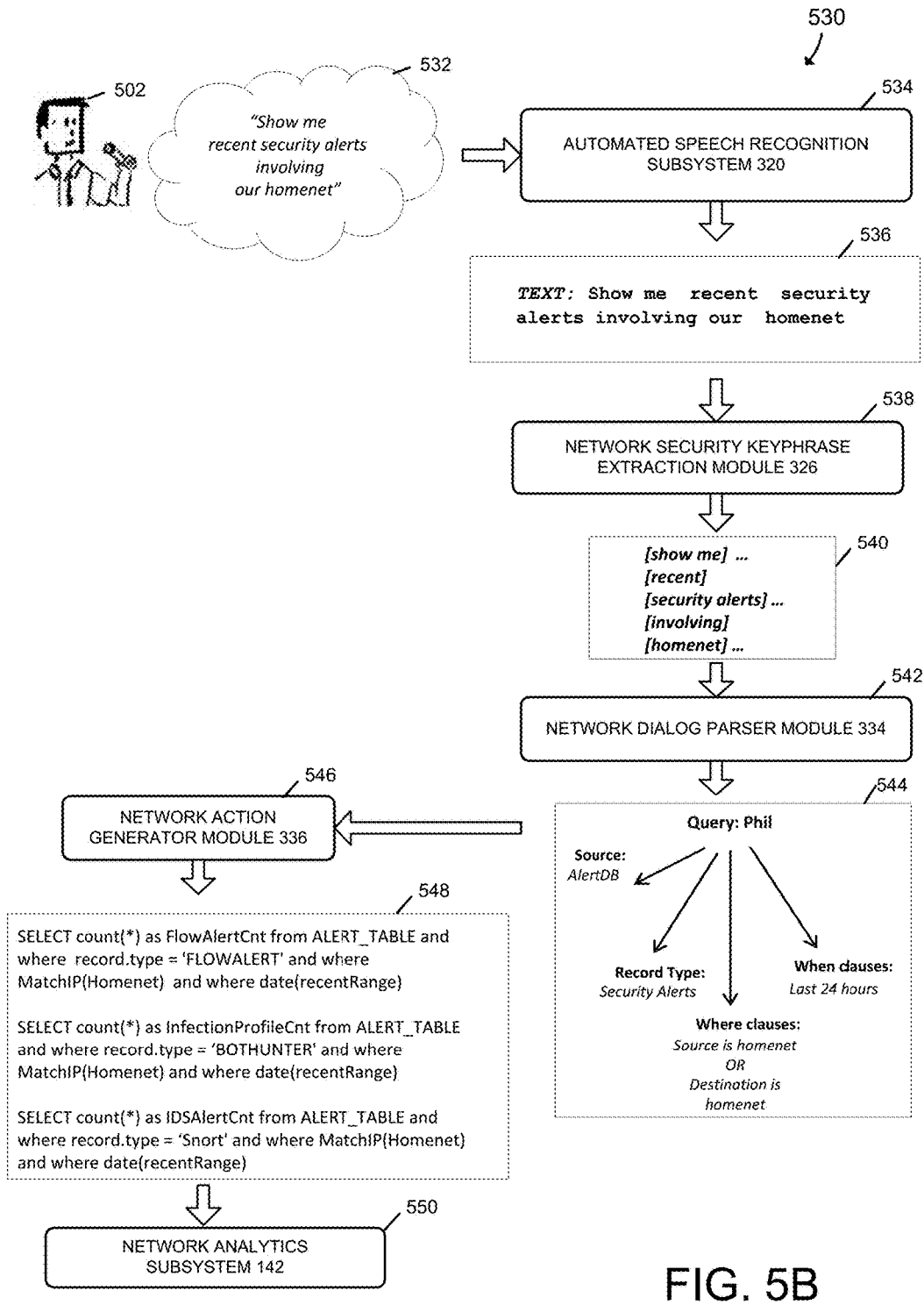
FIG. 5B is a simplified flow diagram of at least one embodiment of an operational process by which the computing system of FIG. 1 may translate natural language dialog input to a set of queries executable by one or more components of the network analytics subsystem of FIG. 1.
Figure 5C:
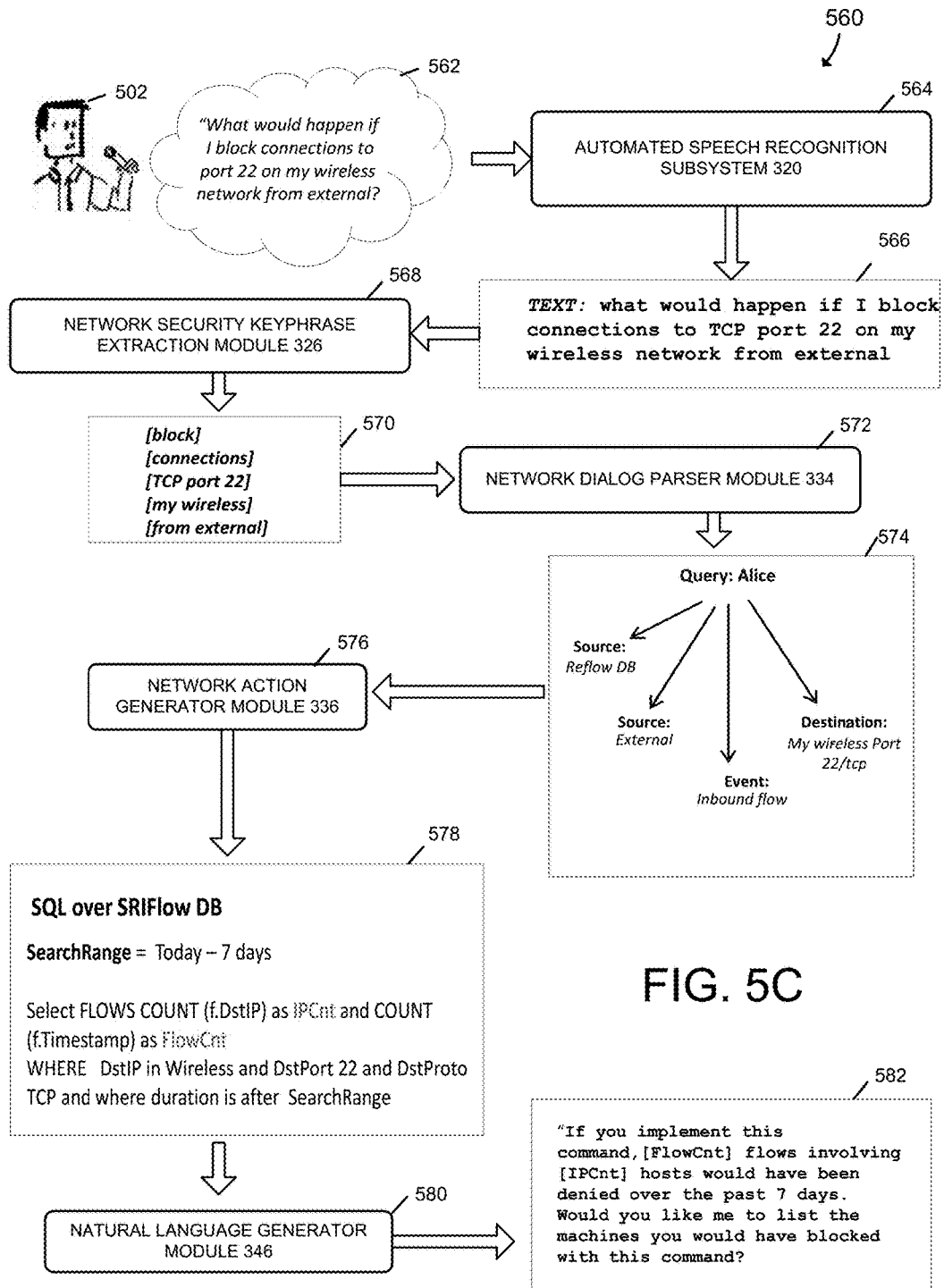
FIG. 5C is a simplified flow diagram of at least one embodiment of an operational process by which the computing system of FIG. 1 may translate natural language dialog input to a set of queries or commands executable by one or more components of the network analytics subsystem of FIG. 1 and/or the network security subsystem of FIG. 1 and present query results in the form of natural language dialog output generated by the natural language generator module of FIG. 1.

Referring now to FIGS. 5A-5C, illustrative examples of translations of NL dialog-based interactions, which may be performed by the system 110, are shown. In FIG. 5A, a dialog 500 between a user 502 and the system 110 is initiated by the user 502 speaking the NL phrase shown in 504. At 506, the NL speech 504 is processed by the ASR subsystem 320. The ASR subsystem 320 outputs the NL text shown in 508. The NL text 508 is processed by the network security keyphrase extraction module 326, at 510. At 510, the network keyphrase extraction module 326 identifies the key words and phrases shown in brackets in 512. The bracketed words and phrases shown in 512 are, at 510, extracted by the network keyphrase extraction module 326, and analyzed by the network dialog parser module 334 in 514. The network dialog parser module 334 generates a parse tree 516 based on the extracted key words and phrases 512 (words and phrases may be referred to herein collectively or individually as "keyphrases." In creating the parse tree 516, the parser module 334 assigns semantics to information contained in or derived from the key words and phrases 512; e.g., the parser module 334 determines one or more actions to be performed by the system 110 based on the keyphrases 512 (e.g., email deny flow), as well as arguments or parameters to associate with those actions (e.g., source=peripherals, event=outbound flow, destination=non-US), in accordance with rules defined by, e.g., a network security ontology. The elements of the parse tree 516 are processed by the network action generator module 337, in 518. The network action generator module 337 generates the network-actionable directive 520, based on the parse tree 516. The directive 520 may be generated as "intermediate-level" code, which is then converted to device-executable instructions (e.g., by the security initiative translator module 410). Alternatively, the directive 520 may be generated directly as device-executable instructions, e.g., machine readable code that can be executed by one or more devices of the network 150. In any case, the directive 520 is processed by the network security subsystem 130, in 522. The network security subsystem 130 initiates the implementation of the directive 520 by the network 150, e.g., by sending the directive 520 or its device-executable counterpart to one or more nodes and/or switching devices of the network 150.

In FIG. 5B, a dialog 530 between the user 502 and the system 110 is initiated by the user 502 speaking the NL phrase shown in 532. The process is similar to that of FIG. 5A except that in FIG. 5B, the system 110 generates queries rather than commands At 534, the NL speech 532 is processed by the ASR subsystem 320. The ASR subsystem 320 outputs the NL text shown in 536. The NL text 536 is processed by the network security keyphrase extraction module 326, at 538. The network keyphrase extraction module 326 identifies the key words and phrases shown in brackets in 540. The bracketed words and phrases shown in 540 are extracted by the network keyphrase extraction module 326, in 538, and analyzed by the network dialog parser module 334, in 542. The network dialog parser module 334 generates a parse tree 544 based on the extracted key words and phrases 540. In creating the parse tree 544, the parser module 334 assigns semantics to information contained in or derived from the key words and phrases 540; e.g., the parser module 334 determines one or more actions to be performed by the system 110 based on the keyphrases 540 (e.g., "query"), as well as arguments or parameters to associate with those actions (e.g., source=AlertDB, record type=security alerts, where=source is homenet, when=last 24 hours), using, e.g., a network security ontology. The elements of the parse tree 544 are processed by the network action generator module 337, in 546. The network action generator module 337 generates the network-actionable directive 548, based on the parse tree 544. The illustrative directive 548 includes a number of database queries written in a machine readable query language, such as SQL. At 550, the queries 548 are executed by the system 110 on one or more databases of the network analytics subsystem 142 (e.g., any of those shown in FIG. 2). While not specifically shown in FIG. 5B, the network analytics subsystem 142 returns query results, which the system 110 presents to the user 502 as NL dialog output 126 and/or visual output 128, by way of the user interface subsystem 836.

FIG. 5C illustrates an operational process of the system 110 that is similar to that shown in FIG. 5B, but involves an impact analysis performed by the system 110. In FIG. 5C, a dialog 560 between the user 502 and the system 110 is initiated by the user 502 speaking the NL phrase shown in 562. The process is similar to that of FIG. 5B in that the system 110 generates queries. At 564 the NL speech 562 is processed by the ASR subsystem 320. The ASR subsystem 320 outputs the NL text shown in 566. The NL text 566 is processed by the network security keyphrase extraction module 326, at 568. The network keyphrase extraction module 326 identifies the key words and phrases shown in brackets in 570. The bracketed words and phrases shown in 570 are extracted by the network keyphrase extraction module 326, in 568, and analyzed by the network dialog parser module 334, in 572. The network dialog parser module 334 generates a parse tree 574 based on the extracted key words and phrases 570. In creating the parse tree 574, the parser module 334 assigns semantics to information contained in or derived from the key words and phrases 570. For instance, the parser module 334 determines one or more actions to be performed by the system 110 based on the keyphrases 540 (e.g., "query"), as well as arguments or parameters to associate with those actions (e.g., source=AlertDB, record type=security alerts, where=source is homenet, when=last 24 hours) (e.g., based on network security ontology). The elements of the parse tree 574 are processed by the network action generator module 337, in 576. The network action generator module 337 generates the network-actionable directive 578, based on the parse tree 574. The illustrative directive 578 includes a number of database queries written in a machine readable query language, such as SQL. The queries 578 are executed by the system 110 on one or more databases of the network analytics subsystem 142 (e.g., any of those shown in FIG. 2) and/or the network security subsystem 130. While not specifically shown in FIG. 5C, the network analytics subsystem 142 and/or the network security subsystem 130 returns query results, which, in 580, the natural language generator module 346 converts to NL dialog output 582. The natural language generator module 346 interfaces with the user interface subsystem 836 to output the NL dialog output 582 as system generated speech, via one or more speakers of the computing system 100.

Figure 6A:
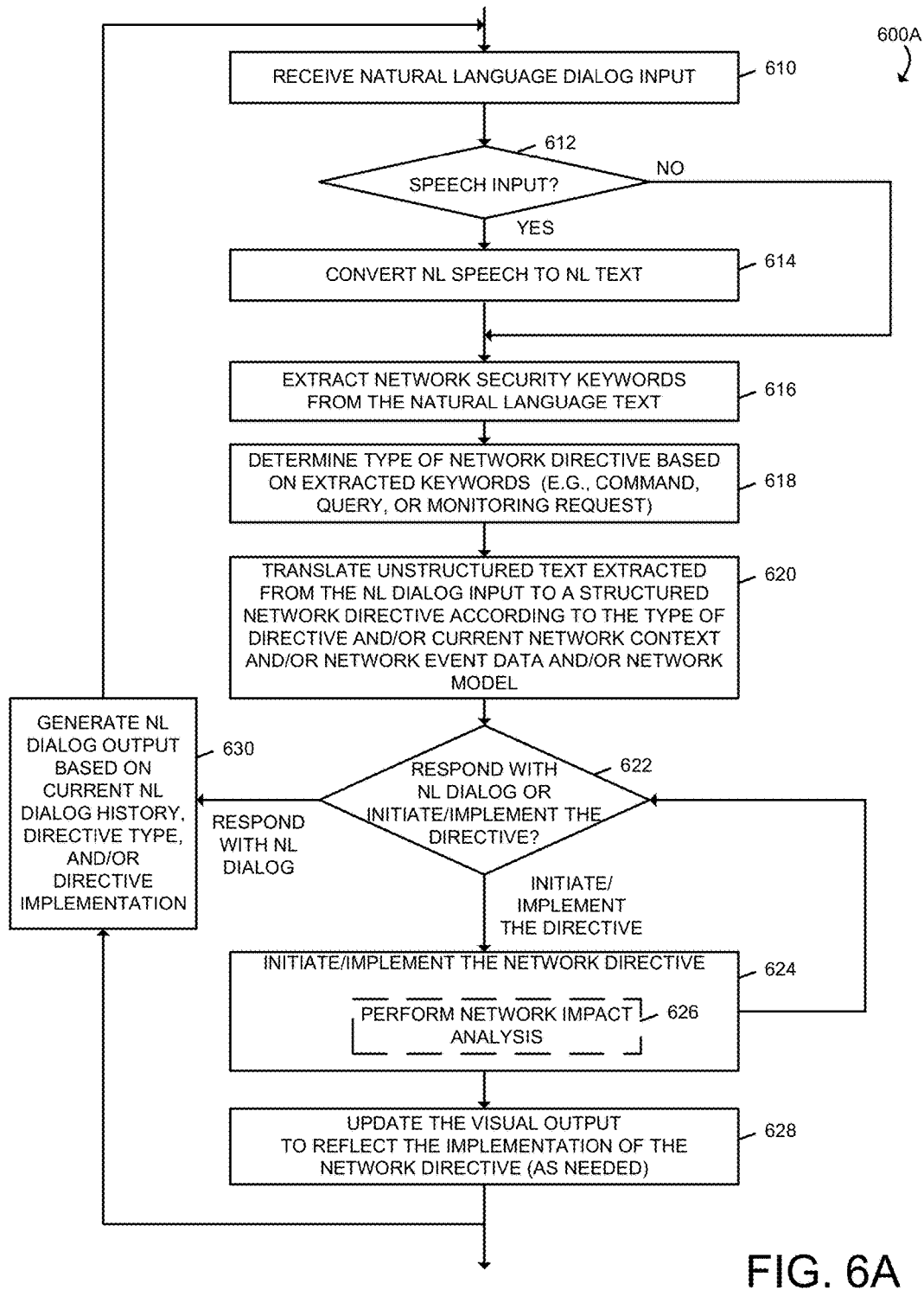
FIG. 6A is a simplified flow diagram of at least one embodiment of a method by which the computing system of FIG. 1 may handle natural language dialog input relating to computer network security or management.

Referring now to FIG. 6A, an illustrative method 600A for handling natural language dialog input relating to computer network security is shown. The method 600A may be embodied as computerized programs, routines, logic, and/or instructions of the computing system 100, e.g., hardware, firmware, software or a combination thereof (e.g., software written using a programming language such as Java or Python), as part of the various components of the network security management system 110, e.g., the NL dialog subsystem 190. In block 610, the computing system 100 receives natural language dialog input from a user of the network security management system 110, e.g., via a microphone or chat window. In block 612, the system 100 determines whether the input received in block 610 includes speech (e.g., spoken natural language dialog). If the input received in block 610 includes speech, the system 100 converts the natural language speech to natural language text, in block 614. To do this, the system 100 performs automated speech recognition to process the acoustic speech signals and determine the words and phrases contained in the speech input (using, e.g., the automated speech recognition subsystem 320). Following block 614, or if the input received in block 610 does not contain speech (e.g., includes only natural language dialog in text form, as may be input during an online chat session), the system 100 proceeds to block 616.

In block 616, the system 100 extracts network security-related key words or phrases (e.g., keyphrases 330) from the NL input received in block 610 or NL speech converted to NL text in block 614, as the case may be. To do this, the system 100 accesses and applies network security domain-specific rules, templates, or data relationships implemented as an ontology, for example, to identify and extract key phrases of the input that are meaningful in the context of computer network security, such as queries for information about the network or one or more network components, network security commands, and/or other types of network-related requests. As used herein, "extract" may refer to, for example, an information extraction process in which words or phrases are tagged with identifiers or copied and stored e.g., in a data structure. In block 618, the system 100 determines, based on the key phrases identified and extracted in block 616, the type of network directive that is evidenced by the extracted words and/or phrases. For example, the system 100 may determine that based on the extraction of the phrase, "tell me," the network directive type is a query, from which a network exploration directive 118 may be formulated. As another example, if the word "quarantine" is extracted, the system 100 may classify the input as corresponding to a directive type of "command" from which a network security initiative 124 may be formulated.

In block 620, the system 100 translates the relatively unstructured text extracted from the NL input in block 616 to a structured network directive (e.g., to a network exploration directive 118 or network security initiative 124), as the case may be, according to the network directive type determined in block 618. In formulating the network directive (e.g., a network exploration directive 118 or network security initiative 124), the system 100 may consider the current network context 144, network event indicators 146, and/or other data (e.g., impact assessment data 148) (alone or in combination with information provided by the network model 192). For instance, the system 100 may utilize the current network context 144 and/or portions of the network model 192 to supply one or more arguments for the structured network directive (such as IP addresses of machines involved in a problematic data flow).

In block 622, the system 100 evaluates the network directive and determines whether to respond with system-generated NL dialog output or to proceed with initiating or implementing the network directive. For instance, if the system 100 has a low confidence (e.g., less than a threshold confidence level) in the accuracy of its interpretation of the NL input (as performed in block 620), the system may proceed to block 630 and respond by outputting NL dialog asking the user for further clarification of the request. The system 100 initiates or implements the directive, in block 624, if, for example, no clarification of the NL input is needed (e.g., the system 100 has a high confidence, e.g., greater than a threshold value), that its interpretation prepared in block 620 is accurate). Initiation or implementation of the directive created in block 620 may involve, in block 624, executing one or more queries, analyzing the current network context 144, analyzing network event indicators 146, analyzing impact assessment data 148, or implementing one or more network-executable actions 132. For instance, in block 626 the system 100 may perform a network impact analysis of a requested network-executable action 132 and provide the results of the network impact analysis to the user by returning to blocks 622 and 630, prior to implementing the network-executable action 132 (and then if subsequent NL dialog is received from the user authorizing the network-executable action 132 after the system 100 has provided the impact analysis data in a round of dialog, the system 100 may return to block 624 and implement the network-executable action 132). In block 628, the system 100 updates the visual output 128 as needed to inform the user of the implementation of the network directive, as performed by the system 100 in block 624. For instance, if in block 624 the system 100 executes a network-executable action 132 to quarantine a network node, the system 100 may in block 628 update the graphical elements of the visual output 128 to indicate graphically in the visual output 128 that the node is now quarantined. Following block 628, the system 100 may proceed to block 630, proceed to return directly to block

610, or end the execution of the method 600A. In block 630, the system 100 may output system-generated NL dialog to inform the user that the requested directive has been executed, or provide other NL dialog output as needed. Following block 630, the system 100 may return to block 610 to await another instance of NL dialog input from the user, or end the method 600.

Figure 6B:
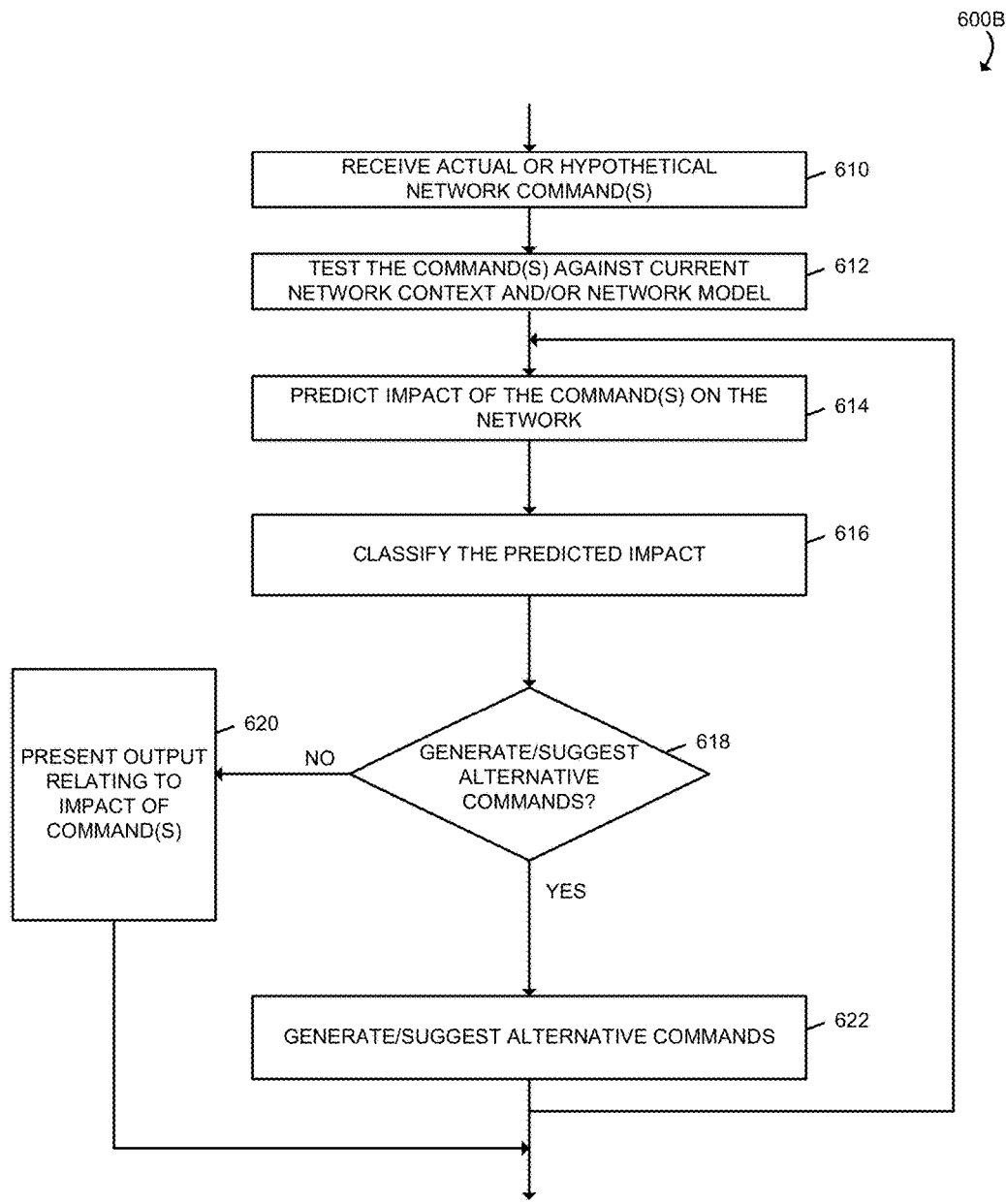
FIG. 6B is a simplified flow diagram of at least one embodiment of a method by which the computing system of FIG. 1 may perform impact analysis of a network directive or action on a computer network.

Referring now to FIG. 6B, an illustrative method 600B for generating an impact analysis of a network directive or action is shown. The method 600B may be embodied as computerized programs, routines, logic, and/or instructions of the computing system 100, e.g., hardware, firmware, software or a combination thereof (e.g., software written using a programming language such as Java, C++, Python, etc.), as part of the various components of the network security management system 110, e.g., the network inquiry handling module 116. In block 610, the computing system 100 receives one or more actual or hypothetical network commands. The command(s) may be supplied by a human network administrator or generated programmatically, e.g., by a network application. The command(s) may be issued in a natural language dialog format, in which case, they may be interpreted by other components of the computing system 100, as described above. The command(s) may be received prospectively, e.g., before they have been implemented by the network 150. The command(s) may be generated in response to a current network event or as part of a hypothetical test or training scenario, for instance.

In block 612, the computing system 100 analyzes or tests the command(s) received in block 610 against one or more aspects of the network 150, e.g., a portion of the current network context and/or a portion of the network model. To do this, the computing system 100 may apply a set of rules to the command(s), e.g., by extracting entities, arguments, parameters, and/or actions from the command(s) and inputting the extracted data into a rules engine, which outputs a result of the application of rules to the command(s). In some embodiments, the system 100 may apply the command(s) to an offline simulation of the network 150 and evaluate the results of the simulation.

In block 614, the computing system 100 generates a predicted impact of the command(s) received in block 610 on one or more aspects of the operation of the network 150, should the command(s) be implemented during the current network conditions (i.e., the current network context) or in accordance with the network model. As used herein, "impact" or "impact assessment" may refer to a measure of disruptiveness of the proposed network commands or initiatives, such as proposed network topology changes. For instance, a disruption can occur when a topology change impacts the communications of one or more critical assets on the network. For critical assets, the disruption significance can depend on whether the change impacts the direction of the impacted communication (e.g., whether the impacted communication is sent to or received from a critical asset). Disruption may have increasing significance as the number of impacted network assets (e.g., local nodes) increases. As an example, an action that disrupts access to a business critical server is potentially impactful, while an action that disrupts access to a single local workstation is likely to be less impactful. As another example, an action that affects ongoing communications among 5 local IPs is more disruptive to the network (and the IT staff) than an action that affects only 1 local IP.

Examples of network topology changes include network actions that cause one or more communications to be blocked, quarantined, redirected, or denied/dropped, or that cause one or more nodes to be quarantined, disconnected, or unplugged (physically or virtually) from the network. As used here, "block" may refer to, for example, a network topology change action to drop all duplex communications from a remote node to all hosts in a home network; "quarantine" may refer to an action that isolates a local IP address, e.g., by redirecting all DNS and Web communications to a notification server; "redirect" may redirect output communications (e.g., to redirect all flows that are FROM CIDR 1 TO CIDR 2) or inbound communications (e.g., to redirect all flows that are TO CIDR 1 TO CIDR 2); "disconnect" or "unplug" may implement an effective disconnection of a node from the network (where the implementation of the disconnect/unplug may differ if IP is wireless or wired); "deny/drop" may drop an ongoing flow (e.g., a flow from one node to another node). The network topology changes or "actions" listed above are merely exemplary and it should be understood that embodiments of the impact analysis technology disclosed herein can handle many other types of actions.

As noted above, the predicted impact can be based on current network context information, past network context information, or a combination of current and historical information. To do this, the computing system 100 analyzes the output of block 612 against, for example, a high level mission or business objective of the network 150, and/or some other criteria, and identifies or estimates the event(s) and/or other consequences that are likely to occur if the proposed command(s) are implemented. For instance, the computing system 100 may analyze the number of nodes or flows that would be affected by the command if the command were implemented, and compare the number of nodes or flows to a threshold value (e.g., a numerical value). As another example, the command received in block 610 may be, "quarantine node x." The analysis performed at block 612 may involve a look up of information about node x. For instance, based on one or more aspects of the network 150 that may be determined by accessing or searching the source(s) of network information 190, the system 100 may determine that node x is a machine with high throughput, or a machine that serves customers from a large and active market, or a machine that handles communications between other critical nodes, etc. Alternatively or in addition, the system 100 may determine (e.g., based on network topology data) that quarantining node x will cause certain network flows to be redirected to other nodes, or that disconnecting node y would cause a large number of complaints from end users and/or human network administrators, etc. The system 100 may then proceed to further evaluate the consequences of such redirection of flows to other nodes, e.g., by examining data that indicates or describes the roles, geographic locations, or other characteristics of the other nodes to which the flows would be re-routed. In some embodiments, the computing system 100 may utilize more sophisticated prediction techniques, such as statistical inference or machine learning.

In block 616, the computing system 100 classifies the impact prediction generated in block 614, e.g., according to a pre-defined or learned classification scheme (e.g., a set of rules indicating conditions that are considered high, medium, and low impact). In some embodiments, the system 100 may compute and present to the user a numerical score indicative of a severity level of the predicted impact (e.g., "on a scale of 1 to 10, the predicted impact is 11!").

Continuing the above example, if the human network administrator is working at an e-commerce company, (such as EBAY), the mission of the networked system might include providing customer service, database operations, etc. However, if the human administrator is working at a messaging/communications company (e.g., SKYPE), the mission of the system might be to provide low-latency communications between customers. Other examples of network missions include: "provide database services" or "provide banking services to customers" or "support emergency response management."

In the EBAY example, the system 100 may conclude that the command would have a high impact on the network, and tell the user that "the proposed action is high impact, because quarantining that machine would reduce the ability to serve customers outside the US." However, in the SKYPE example, the system 100 may conclude that the proposed action is high impact for a different reason, and tell the user that "that action is high impact because it would increase latency of VOIP calls between Montreal and Toronto." Thus, the system 100 may arrive at a different impact prediction, or a different explanation as to the reason for the impact classification given in block 616, depending on the mission or business objective of the networked system. Further, in some embodiments, the system 100 may utilize a network policy to evaluate the impact of the proffered command. For example, if the system 100 concludes that the command submitted in block 610 would violate an inflexible portion of the policy for the network 150, the system 100 may conclude that the impact of implementation of the command would be high.

In some embodiments, the impact classification is based on criticality labels associated with nodes that would be affected by the proposed network initiative. Some examples of criteria that may be used to determine whether a node (internal or external node) is to be considered critical include: the node hosts a business-critical application (e.g., a network service, a file server, or a payroll service application); the node hosts business-critical data (e.g., stores customer private data, stores backup data, etc.); the node is a local IP owned by a network operator (e.g., certain workstations can be considered critical); and/or other reasons, which may be defined based on the requirements of a particular design or implementation of the system 100 (e.g., this host is supporting a mission-critical project task).

Table 3 below illustrates an exemplary classification scheme based on node criticality. The degree of criticality of a node can be assigned manually, e.g., by a network administrator, and stored in a database (e.g., as part of the network topology data), or the criticality can be machine-determined based on one or more node characteristics, such as applications hosted by the node, number of connections, etc.

TABLE 3

Exemplary criticality based impact classification.

| Source Node | Destination Node | Predicted Impact |
|---|---|---|
| Critical | Non-Critical | Medium |
| Non-Critical | Critical | High |
| Non-Critical | Non-Critical | Low |
| Critical | Critical | High |

In some embodiments, the system 110 evaluates both criticality and disruptiveness to determine the impact classification. For instance, some embodiments utilize a two-tiered approach in which criticality of an affected node is determined and then disruptiveness is evaluated if the criticality score is low. Thus, even if a node has a low criticality rating, the impact classification can be "high" if the impact is determined to have a high degree of disruptiveness. Factors that the system 110 may consider in classifying the impact include, for instance, the number of flows that would be disrupted (which may be estimated based on recent prior flow data), direction of flows (e.g., to or from critical or non-critical node), whether a node is internal or external, whether a node is running a critical application, hosting critical data, connected to by a critical asset, number of connections to the node, likely number of complaints (from users, etc.) if a node is quarantined or disconnected, asset administrator and/or user information (e.g., role, contact, and/or privilege information about the administrator or user, applications frequently used, etc.) and/or other criteria.

In some embodiments, the system 110 evaluates the effect of a network action (e.g., topology change) based on the degree to which the action would affect communications of local nodes or assets (e.g., flow-based impact assessments). Embodiments of the system 110 can perform flow-based impact assessments for current, ongoing connections or based on historical information. Examples of assessment factors that may be considered for ongoing connections include: the number of unique local IP addresses that could have an outbound connection severed/disconnected; or the number of unique non-local IP addresses that could have an inbound connection severed. Examples of assessment factors that may be considered for assessments based on historical information include: the number of unique local IP addresses that would have had an outbound connection severed; or the number of unique non-local IP addresses that would have had an inbound connection severed.

In some embodiments, the system 110 performs command-specific impact assessment, alternatively or in addition to flow-based assessment. In other words, the impact analysis may differ based on the particular command or action being analyzed. For example, an impact assessment of a deny or drop action may include only a criticality assessment and not a flow-based assessment; and the criticality assessment may be based on criteria that are specific to the deny or drop command. For instance, if both source and destination nodes involved in a flow that may be dropped are non-critical nodes the impact assessment may be "low" but if at least the source node is a critical node, the impact assessment of a drop command of a flow from the source may be "medium" (if the destination node is considered non-critical) or "high" (if the destination node is also considered critical).

The system 110 may perform a different type of impact assessment on block commands. For instance, the system 110 may perform both a criticality assessment and a flow-based assessment for the block commands. Moreover, the criticality assessment may be different than the criticality assessment for drop commands (e.g., the criticality assessment for block commands may be based simply on the criticality of the node that is the target of the block command) The flow-based assessment for block commands may utilize any of the criteria mentioned above and/or other flow-based criteria. For instance, impact assessment criteria for block commands may include the number of IP addresses impacted, the number of flows disrupted, the type of protocol or application flows disrupted, the time of day or day of week (i.e., when are people likely to be using the blocked asset). To perform the impact assessment of a block command, the system 110 may utilize one or more threshold values and compare the number of disrupted IP addresses to the threshold value. Alternatively, the system 110 may utilize a scoring function, which decays the contribution of each IP-filter event based on temporal distance from the present. The system 110 may perform a similar or a different type of impact assessment for quarantine or disconnect commands, which may involved both a criticality assessment and a flow-based assessment. For redirect commands, the system 110 may perform a criticality assessment but not a flow-based assessment.

In block 618, the computing system 100 determines whether to generate or suggest any alternative options to the command(s) received in block 610. To make this determination, the computing system 100 may evaluate the classification given in block 616. For instance, if the predicted impact is classified in block 616 as "high," the logic at block 618 may conclude that alternative command(s) should be generated or suggested, while if the predicted impact is "low," there is no need to generate alternatives (e.g., the command received in block 610 can simply be implemented). If the system 100 concludes in block 618 to generate or suggest one or more alternative commands, the system 100 produces the alternative command(s) in block 622. To do this, the system 100 may in some embodiments utilize a simple lookup table or a pre-programmed set of rules to determine which command(s) have been pre-defined as suitable alternatives to the command(s) on which the impact analysis has been performed. In other embodiments, the system 100 may recommend alternatives based on the results of simulations that are conducted using the command alternative(s). Following block 622, the system 100 evaluates and classifies the alternative command(s) produced in block 622 in a similar manner as described above. In block 620, once all of the alternative command(s) (if any) are generated and evaluated, the system presents output relating to the predicted impact of the initially presented command (block 610) as well as any alternatives (block 622). The output may include a description of each command, a description of the impact of each command, and the impact classification (e.g., high, medium, low). The output may include a warning or other type of notification, depending on the severity level of the impact. Similarly, the system 100 may generate a warning if a command is determined to violate a network policy. The output may be presented visually, e.g., text and/or graphics on a display screen, or using system-generated speech output through a speaker. The output may be formulated as natural language text and/or speech. As an example, the system 100 may conclude and tell the user that "the proposed command would have high impact on your mission because no one in Montreal could talk with anyone in Toronto," and then additionally conclude and tell the user that "an alternative action, rerouting traffic through Detroit, may accomplish your current goal and still allow Montreal to talk with Toronto."

Figure 7A:
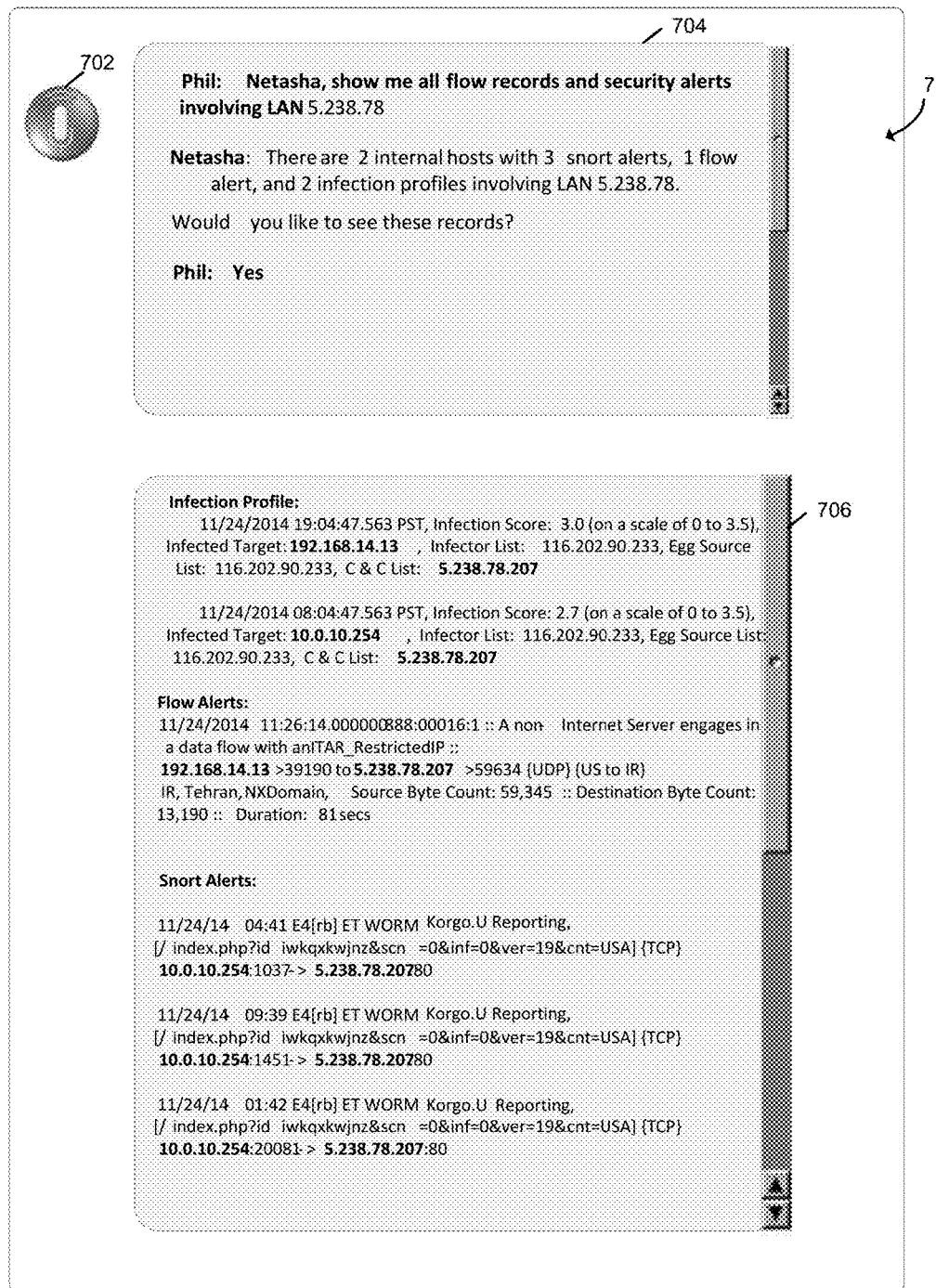
FIGS. 7A-7D each illustrate an embodiment of a user interface screen that may be displayed by the computing system of FIG. 1 in connection with an interactive natural language dialog conducted by the computing system of FIG. 1 with a user in relation to computer network security, as disclosed herein.

Referring now to FIGS. 7A-7D, illustrative examples of interactive NL dialogs between a user and the system 110 are shown. In FIG. 7A, a user interface screen 700 includes a control button 702 by which a user may activate a microphone of the computing system 100, to record NL speech. In this example, the system 100 receives spoken NL dialog input from "Phil," a human network administrator. In the example, Phil has created a nickname by which to refer to the system 100 ("Netasha"—network security help agent). The user interface screen 700 includes a window 704, which displays a transcript of the natural language conversation between Phil and Netasha. In the dialog ("chat") window 704, Phil asks for information about a particular portion of the network 150, and Netasha responds with a high-level conversational spoken natural language reply summarizing the information that Phil requested. The user interface screen 700 also includes an output display window 706. In the window 706, the system 110 outputs the more detailed query results, e.g., the network analytics data that the system 110 retrieved based on Phil's request in window 704.

Figure 7B:
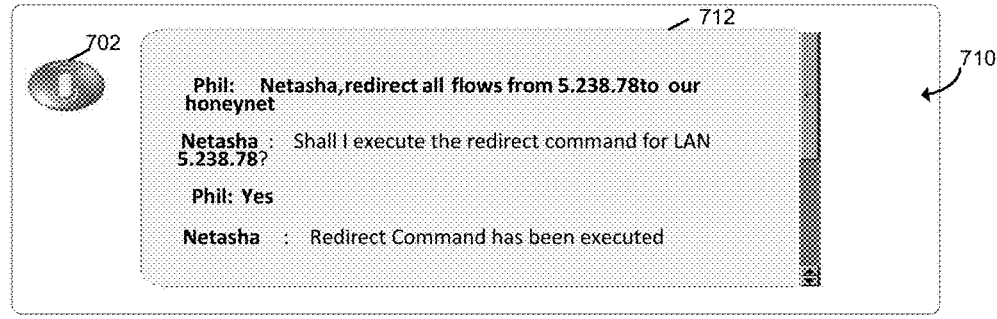

FIG. 7B illustrates a user interface screen 710 including the microphone control button 702 and a chat window 712. The chat window 712 displays a transcript of a spoken natural language conversation involving the human network administrator ("Phil") and the system 110 ("Netasha"), in which Phil has expressed a network command in an intuitive, conversational way ("redirect these flows to the honeynet") and the system confirms and implements Phil's request. In doing so, the system 110 removes the complexity of the task from Phil and converts the high-level NL dialog request to the more complicated system-level instructions needed to execute the requested network task.

Figure 7C:
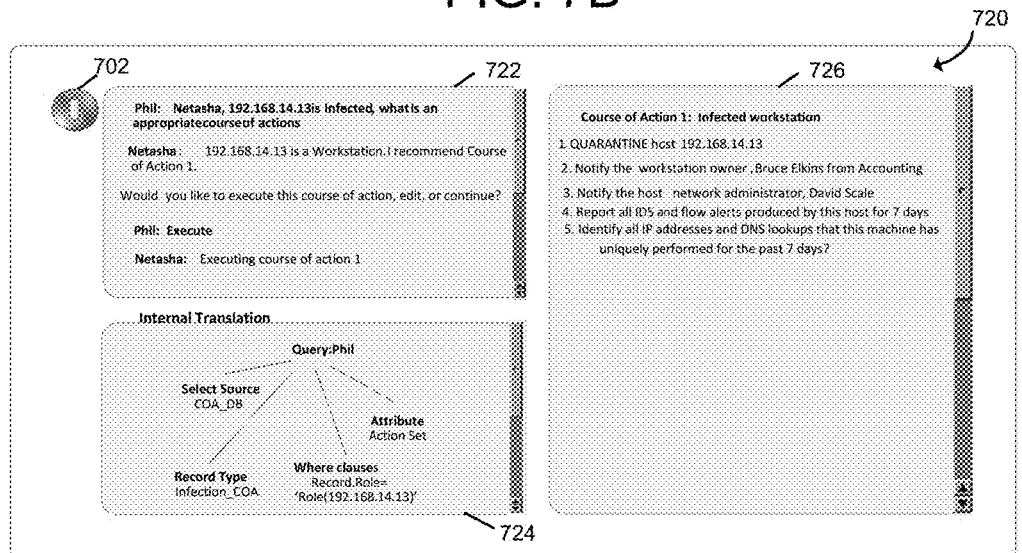

FIG. 7C illustrates a user interface screen 720 including the microphone control 702, a chat window 722, a display window 724 to display internal translation processing, and a display window 726 to display the final NL speech dialog output generated by the system 110 in response to Phil's spoken NL dialog request transcribed in the window 722. In this example, Phil, the human network administrator, is asking the system 110 ("Netasha") for a recommended course of action. As such, the system 110 converts Phil's NL request internally to a parse tree as shown in window 724, which is then translated to a set of queries responsive to Phil's request. The window 726 shows an example of output that may be produced by the system 110 as a result of the course of action reasoning performed by, e.g., the COA reasoning module 340 described above. Additionally, the system's NL response shown in window 722 ("I recommend course of action 1") is based on a network impact analysis performed behind the scenes by the system 110, e.g., by the network impact analysis module 125.

Figure 7D:
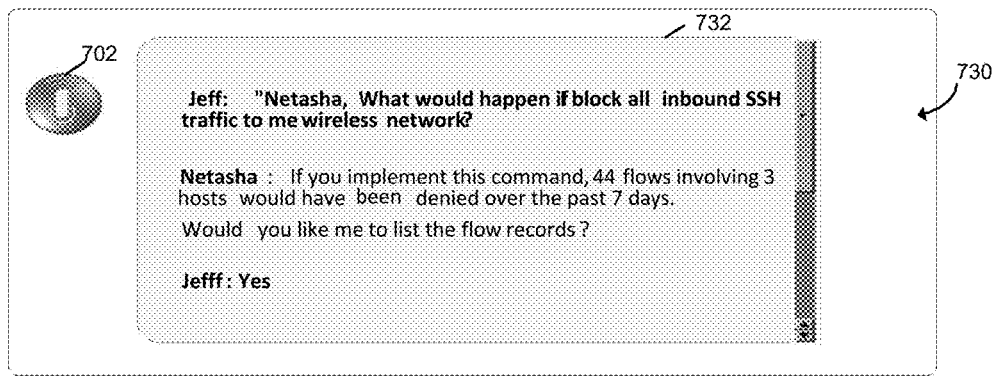

FIG. 7D illustrates a user interface screen 730, which includes the microphone control button 702 and a chat window 732, which displays a transcript of an NL dialog between a human user ("Jeff") and the system 110 ("Netasha"). In this example, Jeff has issued a request for an impact analysis of a proposed or hypothetical course of action. In response, the system 110 executes the requisite database queries and outputs system-generated spoken NL output summarizing the impact analysis. The system 110 also asks Jeff if he would like to view additional information relating to the impact analysis, and when Jeff responds in the affirmative, executes a second query and displays the requested information, e.g., in a display window similar to the display window 706 of FIG. 7A. Thus, in some cases, the NL dialog between the user and the system 110 can include multiple rounds or communicative exchanges.

Figure 8:
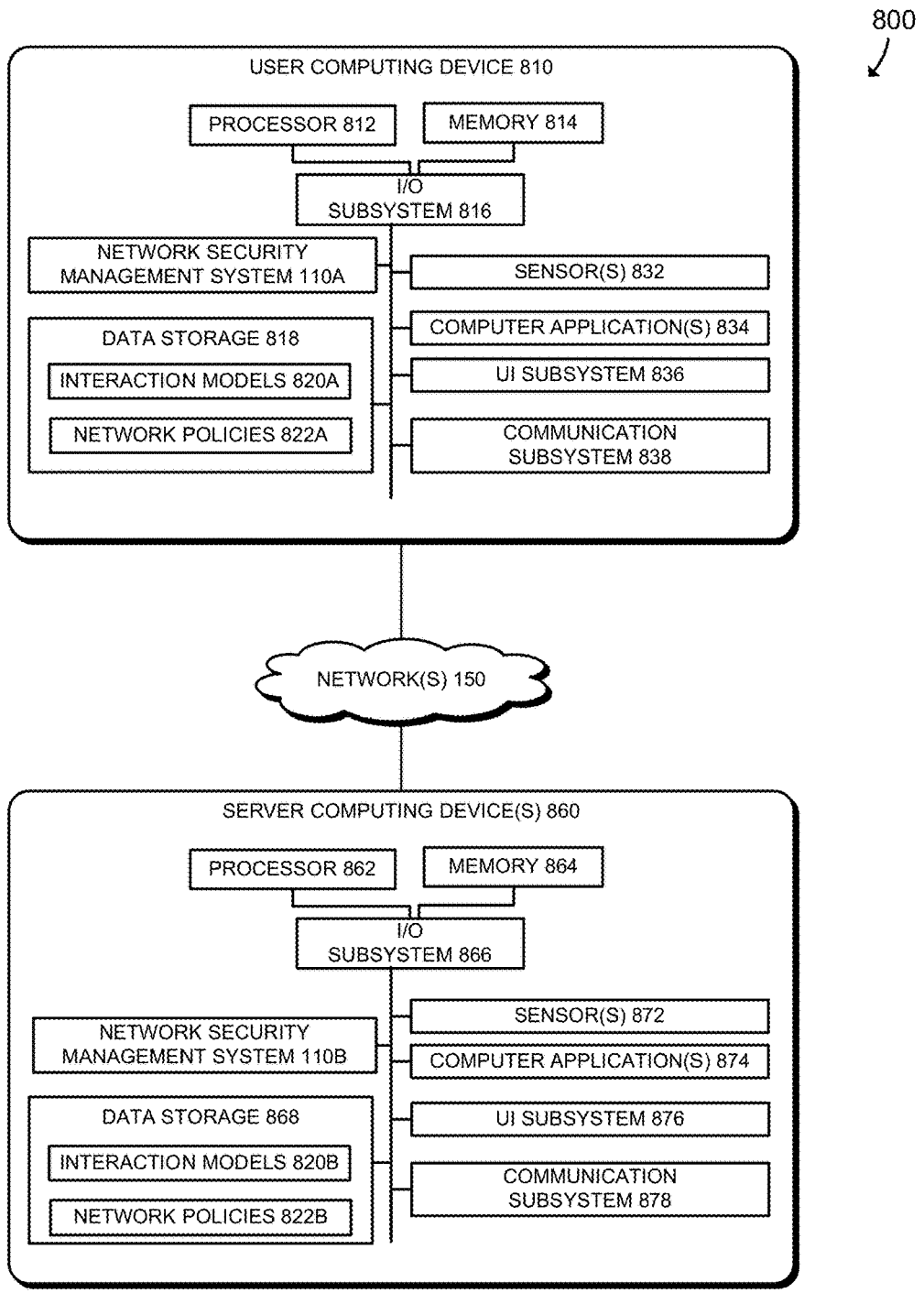
FIG. 8 is a simplified block diagram of an exemplary computing environment in connection with which at least one embodiment of the network security management system of FIG. 1 may be implemented.

Referring now to FIG. 8, a simplified block diagram of an embodiment 800 of the computing system 100 is shown. While the illustrative computing system 800 is shown as involving multiple computing devices, it should be understood that in some embodiments, the computing system 800 may constitute a single computing device, alone or in combination with other devices. The computing system 800 includes a user computing device 810, which may be in communication with one or more server computing devices 860 via one or more networks or honeynets 150. The network security management system 110, or portions thereof, may be distributed across multiple computing devices 810, 860 that are connected to the network(s) 150 as shown. In other embodiments, however, network security management system 110 may be located entirely on the computing device 810. In some embodiments, portions of the system 100 may be incorporated into other computer applications. As used herein, "computer application" may refer to hardware, software, a combination of hardware and software, or any level of software application (e.g., operating system, middleware, libraries, frameworks, and/or interactive user-level applications). For example, portions of the system 100 may be incorporated into or accessed by a network application, a network controller, a network switching device, and/or other systems and devices.

The illustrative computing device 810 includes at least one processor 812 (e.g. a microprocessor, microcontroller, digital signal processor, etc.), memory 814, and an input/output (I/O) subsystem 816. The computing device 810 may be embodied as any type of computing device capable of performing the functions described herein, such as a personal computer (e.g., desktop, laptop, tablet, smart phone, wearable device, body-mounted device, etc.), a server, an enterprise computer system, a network of computers, a combination of computers and other electronic devices, or other electronic devices. Although not specifically shown, it should be understood that the I/O subsystem 816 typically includes, among other things, an I/O controller, a memory controller, and one or more I/O ports. The processor 812 and the I/O subsystem 816 are communicatively coupled to the memory 814. The memory 814 may be embodied as any type of suitable computer memory device (e.g., volatile memory such as various forms of random access memory).

The I/O subsystem 816 is communicatively coupled to a number of hardware and software components and/or other computing systems including a "front end" of the network security management system 110A, a user interface subsystem 836, which includes one or more user input devices (e.g., one or more microphones, touchscreens, keyboards, virtual keypads, etc.) and one or more output devices (e.g., speakers, displays, LEDs, haptic devices, etc.). The I/O subsystem 816 is also communicatively coupled to a number of sensors 832 (e.g., user interaction detection devices 106), one or more data storage media 818, and a communication subsystem 838. It should be understood that each of the foregoing components and/or systems may be integrated with the computing device 810 or may be a separate component or system that is in communication with the I/O subsystem 816 (e.g., over a network 150 or a serial bus connection). While the UI subsystem 836 is shown as embodied in the user computing device 810, it should be understood that portions of the UI subsystem 836 may reside on other computing devices, such as one or more of the server computing device(s) 860.

The data storage media 818 may include one or more hard drives or other suitable data storage devices (e.g., flash memory, memory cards, memory sticks, virtual storage, and/or others). In some embodiments, portions of the network security management system 110A, interaction models and/or databases 820A (e.g., models 322, 328, database 347, etc.), network policies 822A (e.g., policies 228) and/or other data (e.g., network activity data 140, network topology data 220, infection profile data 222, IP reputation data 224, network role data 226) and/or other data reside at least temporarily in the data storage media 818. Portions of the network security management system 110A and/or other data may be copied to the memory 814 during operation of the computing device 810, for faster processing or other reasons.

The communication subsystem 838 may communicatively couple the computing device 810 to one or more communication networks 150, e.g., a local area network, wide area network, personal cloud, enterprise cloud, public cloud, and/or the Internet, for example. Accordingly, the communication subsystem 838 may include one or more wired or wireless network interface software, firmware, or hardware, for example, as may be needed pursuant to the specifications and/or design of the particular computing system 100.

The server computing device(s) 860 may be embodied as any suitable type of computing device capable of performing the functions described herein, such as any of the aforementioned types of devices or other electronic devices. For example, in some embodiments, the server computing device(s) 860 may include one or more server computers including data storage media 768, which may be used to store "back end" portions of the network security management system 110B, models and/or databases 820B (e.g., models 322, 328, database 347), network policies 822B (e.g., policies 228) and/or other data (e.g., network activity data 140, network topology data 220, infection profile data 222, IP reputation data 224, network role data 226, conflicts data 136). The illustrative server computing device 860 includes one or more processors 862, memory 864, an I/O subsystem 866, data storage media 868, sensors 872, computer applications 874, a user interface subsystem 876, and a communication subsystem 878, each of which may be embodied similarly to the corresponding components of the user computing device 810, respectively, described above. The computing system 800 may include other components, sub-components, and devices not illustrated in FIG. 8 for clarity of the description. In general, the components of the computing system 800 are communicatively coupled as shown in FIG. 8 by signal paths, which may be embodied as any type of wired or wireless signal paths capable of facilitating communication between the respective devices and components.

ADDITIONAL EXAMPLES

Illustrative examples of the technologies disclosed herein are provided below. An embodiment of the technologies may include any one or more, and any combination of, the examples described below.

In an example 1, a network management system including one or more computing devices is configured to: receive input from a human administrator of a computer network, the input comprising an actual or hypothetical command relating to security of the computer network; access data indicative of a context of the computer network in live operation; based on at least one of the context and a network model, predict an impact of execution of the command on an aspect of the operation of the computer network; and present output relating to the predicted impact of the command on the operation of the computer network.

An example 2 includes the subject matter of example 1, wherein the aspect of the operation of the computer network relates to a mission or business objective of the computer network, and the one or more computing devices are configured to predict an impact of execution of the command on the mission or business objective of the computer network. An example 3 includes the subject matter of example 1 or example 2, wherein the aspect of the operation of the computer network relates to the flow of network traffic on the computer network, and the one or more computing devices are configured to predict an impact of execution of the command on the flow of network traffic on the computer network. An example 4 includes the subject matter of any of examples 1-3, wherein the one or more computing devices are configured to predict the impact of execution of the command based on at least a portion of a network model. An example 5 includes the subject matter of any of examples 1-4, wherein the one or more computing devices are configured to predict the impact of execution of the command based on a criticality of a node that would be affected by execution of the command An example 6 includes the subject matter of any of examples 1-5, wherein the one or more computing devices are configured to predict the impact of execution of the command based on a measure of disruptiveness of the command An example 7 includes the subject matter of any of examples 1-6, and is configured to determine the context of the network based on a number of previous or current data flows on the network, or network infection data generated by one or more network analytics systems, or network role data, or network topology data, or network policy data. An example 8 includes the subject matter of any of examples 1-7, and is configured to predict the impact of execution of the command based on a combination of node criticality data and disruptiveness data. An example 9 includes the subject matter of any of examples 1-8, and is configured to output a warning if the predicted impact conflicts with a network policy or conflicts with a business objective of the network or exceeds a threshold. An example 10 includes the subject matter of any of examples 1-9, and is configured to output a one or more alternative options to the command based on the predicted impact of the command An example 11 includes the subject matter of any of examples 1-10, and is configured to output an explanation of the predicted impact, wherein the explanation of the predicted impact is based on a mission or business objective of the network. An example 12 includes the subject matter of any of examples 1-11, wherein the command comprises a request to quarantine a node of the network and the predicted impact comprises data indicative of the number of nodes and/or data flows that would be affected if the node were quarantined. An example 13 includes the subject matter of any of examples 1-12, wherein the command comprises a request to block network connections to one or more nodes and the predicted impact comprises data indicative of the number of nodes and/or data flows that would be affected if the request to block network connections were implemented on the network. An example 14 includes the subject matter of any of examples 1-13, wherein the command comprises a request to redirect network connections from a node to another node and the predicted impact comprises data indicative of the number of nodes and/or data flows that would be affected if the request to redirect network connections were implemented on the network. An example 15 includes the subject matter of any of examples 1-14, and is configured to classify the predicted impact of the command according to a classification schema and present output indicative of the classification of the predicted input. An example 16 includes the subject matter of any of examples 1-15, and is configured to generate a plurality of candidate commands in response to the human administrator input, perform an impact analysis on each of the candidate commands, and recommend one of the candidate commands to the human administrator based on the impact analysis.

In an example 17, a method for network management includes, with one or more computing devices: receiving input from a human administrator of a computer network, the input comprising an actual or hypothetical command relating to security of the computer network; accessing data indicative of a context of the computer network in live operation; based at least on the context, predicting an indirect impact of execution of the command on the flow of network traffic on the computer network; and presenting output relating to the predicted impact of the command on the computer network.

An example 18 includes the subject matter of example 17, and includes determining the context of the network at least in part by algorithmically correlating network activity data indicative of live data flows on the network with one or more of: network infection data generated by one or more network analytics systems, network role data, network topology data, and network policy data. An example 19 includes the subject matter of example 17 or example 18, and includes executing a query in response to the input, retrieving a subset of the current context data in response to the query, and formulating the predicted indirect impact based on the retrieved subset of the current context data. An example 20 includes the subject matter of any of examples 17-19, and includes outputting a warning if the predicted indirect impact conflicts with a network policy or conflicts with a mission of the network or exceeds a threshold. An example 21 includes the subject matter of any of examples 17-20, and includes outputting a plurality of alternative options to the command if the predicted indirect impact conflicts with a network policy or conflicts with a mission of the network or exceeds a threshold. An example 22 includes the subject matter of any of examples 17-21, and includes outputting a request for additional user input if the predicted indirect impact conflicts with a network policy or conflicts with a mission of the network or exceeds a threshold, and executing the command in response to the additional user input.

In an example 23, a network management system includes, embodied in one or more non-transitory machine accessible storage media, instructions configured to cause one or more computing devices to: receive input from a human administrator of a computer network, the input comprising an actual or hypothetical command relating to security of the computer network; access data indicative of a context of the computer network in live operation; based at least on the context, predict an unintended impact of execution of the command on the flow of network traffic on the computer network; and present output relating to the predicted impact of the command on the computer network.

An example 24 includes the subject matter of example 23, and includes instructions configured to determine the context of the network at least in part by algorithmically correlating network activity data indicative of data flows on the network with one or more of: network infection data generated by one or more network analytics systems, network role data, network topology data, and network policy data. An example 25 includes the subject matter of example 23 or example 24, and includes instructions configured to execute a query in response to the input, retrieve a subset of the context data in response to the query, and formulate the predicted unintended impact based on the retrieved subset of the context data. An example 26 includes the subject matter of any of examples 23-25, and includes instructions configured to output a warning if the predicted unintended impact conflicts with a network policy or exceeds a threshold. An example 27 includes the subject matter of any of examples 23-26, and includes instructions configured to output a plurality of alternative options to the command if the predicted unintended impact conflicts with a network policy or exceeds a threshold.

General Considerations

In the foregoing description, numerous specific details, examples, and scenarios are set forth to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to effect such feature, structure, or characteristic in connection with other embodiments whether or not explicitly indicated.

Embodiments in accordance with the disclosure may be implemented in hardware, firmware, software, or any combination thereof (e.g., software written using a programming language such as Java, C++, Python, etc.). Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, and the like defined herein are defined as such for ease of discussion, and are not intended to imply that any specific implementation details are required. For example, any of the described modules and/or data structures may be combined or divided into sub-modules, sub-processes or other units of computer code or data as may be required by a particular design or implementation of the computing system 100.

In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

This disclosure is to be considered as exemplary and not restrictive in character, and all changes and modifications that come within the spirit of the disclosure are desired to be protected.

The invention claimed is:

1. A system comprising:
one or more processors;
one or more storage media storing instructions which, when executed by the one or more processors, cause the one or more processors to perform operations comprising:
receiving input comprising an action relating to a security objective of a computer network;
testing the action on a network model, wherein the network model models behavior of the computer network in accordance with a business objective that conflicts with the security objective;
generating a set of results, including: (i) when the action modifies a network flow, executing a flow-based assessment that includes determining a number of network flows that involve a source node or a destination node that is disrupted by the action during the testing of the action on the network model, (ii) when the action comprises a network topology change, executing a disruptiveness-based assessment, wherein the disruptiveness-based assessment includes determining a criticality score using a criticality label that is associated with a source node or a destination node that is affected by testing of the action on the network model, and (iii) when the criticality score exceeds a threshold, skipping the flow-based assessment;
determining a classification that is representative of the set of results;
in response to the classification satisfying both the business objective and the security objective, causing a modified version of the action to be executed on the network.

2. The system of claim 1, wherein executing the impact assessment process includes modifying one or more of the flow-based assessment and the disruptiveness-based assessment based on a command type associated with the action.

3. The system of claim 2, wherein executing the impact assessment process includes determining a set of nodes to perform the disruptiveness-based assessment based on the command type.

4. The system of claim 1, wherein the service description data relates to one or more of: an electronic commerce service and a customer service and a database service and a messaging service and a communications service and a banking service and an emergency response service provided by the computer network.

5. The system of claim 1, wherein the instructions, when executed by the one or more processors, cause the one or more processors to perform operations comprising accessing data indicative of a context of the computer network in live operation; based on the data indicative of the context, predicting an impact of execution of the action on an aspect of the operation of the computer network; presenting output relating to the predicted impact of the command on the operation of the computer network.

6. The system of claim 5, wherein the instructions, when executed by the one or more processors, cause the one or more processors to perform operations comprising determining the context of the computer network based on a number of previous or current data flows on the computer network, or network infection data generated by one or more network analytics systems, or network role data, or network topology data, or network policy data.

7. The system of claim 5, wherein the instructions, when executed by the one or more processors, cause the one or more processors to perform operations comprising outputting one or more of a warning and a request for additional user input if the predicted impact conflicts with a network policy or conflicts with a business objective of the computer network or exceeds a threshold.

8. The system of claim 5, wherein the instructions, when executed by the one or more processors, cause the one or more processors to perform operations comprising generating one or more alternative options to the command based on the predicted impact of the command.

9. The system of claim 5, wherein the action comprises one or more of a request to quarantine a node of the computer network or a request to block a network connection or a request to redirect a network flow and the predicted impact comprises data indicative of one or more of a number of nodes and a number of data flows that would be affected if the node were quarantined.

10. The system of claim 5, wherein the instructions, when executed by the one or more processors, cause the one or more processors to perform operations comprising using a machine learning algorithm, classifying the predicted impact of the command according to a classification scheme.

11. The system of claim 5, wherein the instructions, when executed by the one or more processors, cause the one or more processors to perform operations comprising generating a plurality of candidate commands in response to a human administrator input, executing an impact assessment on each of the candidate commands, and recommending one of the candidate commands to a human administrator based on the impact assessment.

12. The system of claim 5, wherein the instructions, when executed by the one or more processors, cause the one or more processors to perform operations comprising, based at least on the context, predicting one or more of an indirect impact and an unintended impact of execution of the action on a flow of network traffic on the computer network.

13. The system of claim 5, wherein the instructions, when executed by the one or more processors, cause the one or more processors to perform operations comprising determining the context of the computer network at least in part by algorithmically correlating network activity data indicative of live data flows on the computer network with one or more of: network infection data generated by one or more network analytics systems, network role data, network topology data, and network policy data.

14. The system of claim 5, wherein the instructions, when executed by the one or, more processors, cause the one or more processors to perform operations comprising executing a query in response to the input; retrieving a subset of the data indicative of the context in response to the query; formulating the predicted impact based on the subset of the data indicative of the context.

15. A method comprising:
receiving input comprising an action relating to a security objective of a computer network;
testing the action on a network model, wherein the network model models behavior of the computer network in accordance with a business objective that conflicts with the security objective;
generating a set of results, including: (i) when the action modifies a network flow, executing a flow-based assessment that includes determining a number of network flows that involve a source node or a destination node that is disrupted by the action during the testing of the action on the network model, (ii) when the action comprises a network topology change, executing a disruptiveness-based assessment, wherein the disruptiveness-based assessment includes determining a criticality score using a criticality label that is associated with a source node or a destination node that is affected by the testing of the action on the network model, and (iii) when the criticality score exceeds a threshold, skipping the flow-based assessment;
determining a classification that is representative of the set of results;

in response to the classification satisfying both the business objective and the security objective, causing a modified version of the action to be executed on the network,
wherein the method is performed by one or more computing devices.

16. The method of claim 15, wherein executing the impact assessment process includes modifying one or more of the flow-based assessment and the disruptiveness-based assessment based on a command type associated with the action.

17. The method of claim 16, wherein executing the impact assessment process includes determining a set of nodes to use while performing the disruptiveness-based assessment based on the command type.

18. The method of claim 15, wherein the service description data relates to one or more of: an electronic commerce service and a customer service and a database service and a messaging service and a communications service and a banking service and an emergency response service provided by the computer network.

19. The method of claim 15, comprising accessing data indicative of a context of the computer network in live operation; based on the data indicative of the context, predicting an impact of execution of the action on an aspect of the operation of the computer network; presenting output relating to the predicted impact of the command on the operation of the computer network.

20. The method of claim 19, comprising determining the context of the computer network based on a number of previous or current data flows on the computer network, or network infection data generated by one or more network analytics systems, or network role data, or network topology data, or network policy data.

21. The method of claim 19, comprising outputting one or more of a warning and a request for additional user input if the predicted impact conflicts with a network policy or conflicts with a business objective of the computer network or exceeds a threshold.

22. The method of claim 19, wherein the action comprises one or more of a request to quarantine a node of the computer network or a request to block a network connection or a request to redirect a network flow and the predicted impact comprises data indicative of one or more of a number of nodes and a number of data flows that would be affected if the node were quarantined.

23. The method of claim 19, comprising using a machine learning algorithm, classifying the predicted impact of the command according to a classification scheme.

24. The method of claim 19, comprising generating a plurality of candidate commands in response to a human administrator input, executing an impact assessment on each of the candidate commands, and recommending one of the candidate commands to a human administrator based on the impact assessment.

25. The method of claim 19, comprising, based at least on the context, predicting one or more of an indirect impact and an unintended impact of execution of the action on a flow of network traffic on the computer network.

26. The method of claim 19, comprising determining the context of the computer network at least in part by algorithmically correlating network activity data indicative of live data flows on the computer network with one or more of: network infection data generated by one or more network analytics systems, network role data, network topology data, and network policy data.

27. The method of claim 19, comprising executing a query in response to the input; retrieving a subset of the data indicative of the context in response to the query; formulating the predicted impact based on the subset of the data indicative of the context.

* * * * *